Dec. 2, 1924.

A. E. AYER 1,517,337

AUTOMATIC COUNTER MOLDING MACHINE

Filed Nov. 9, 1921    15 Sheets-Sheet 1

Inventor:
Albert E Ayer
by J H McCready
his Atty.

Dec. 2, 1924.                                                1,517,337
A. E. AYER
AUTOMATIC COUNTER MOLDING MACHINE
Filed Nov. 9, 1921           15 Sheets-Sheet 2

Inventor:
Albert E. Ayer
by J. H. McCready
his Atty.

Dec. 2, 1924.　　　　　　　　　　　　　　1,517,337
A. E. AYER
AUTOMATIC COUNTER MOLDING MACHINE
Filed Nov. 9, 1921　　　　15 Sheets-Sheet 3
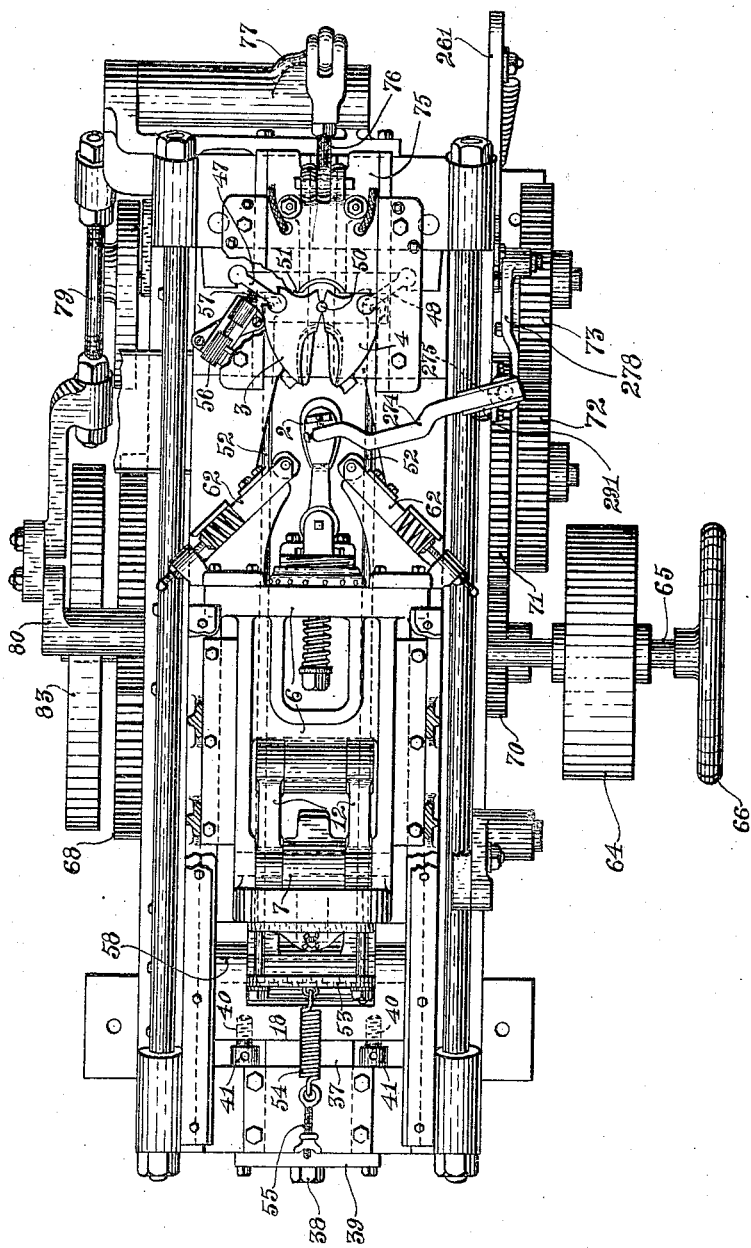
Inventor:
Albert E. Ayer
by J. H. McCready
his Atty.

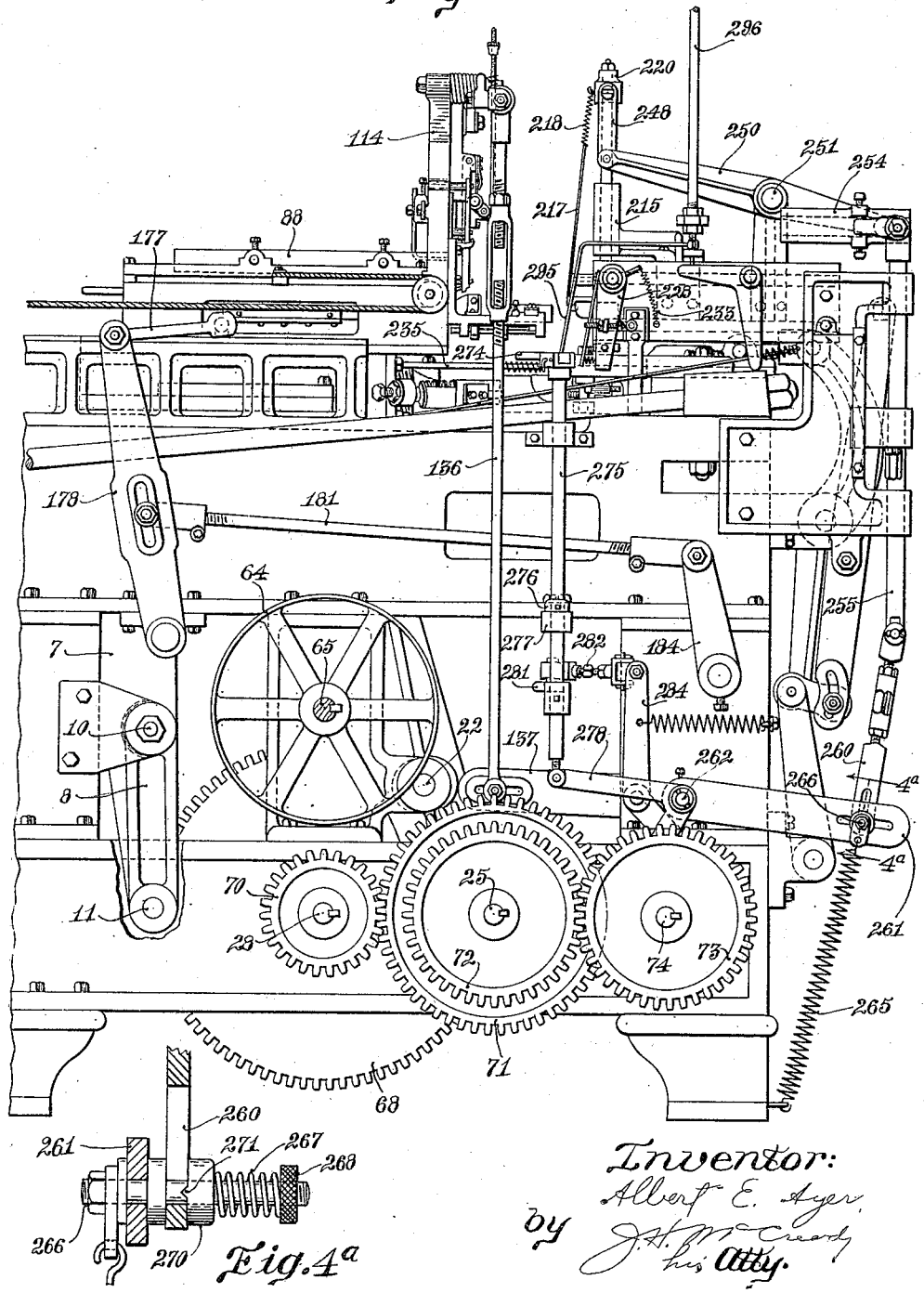

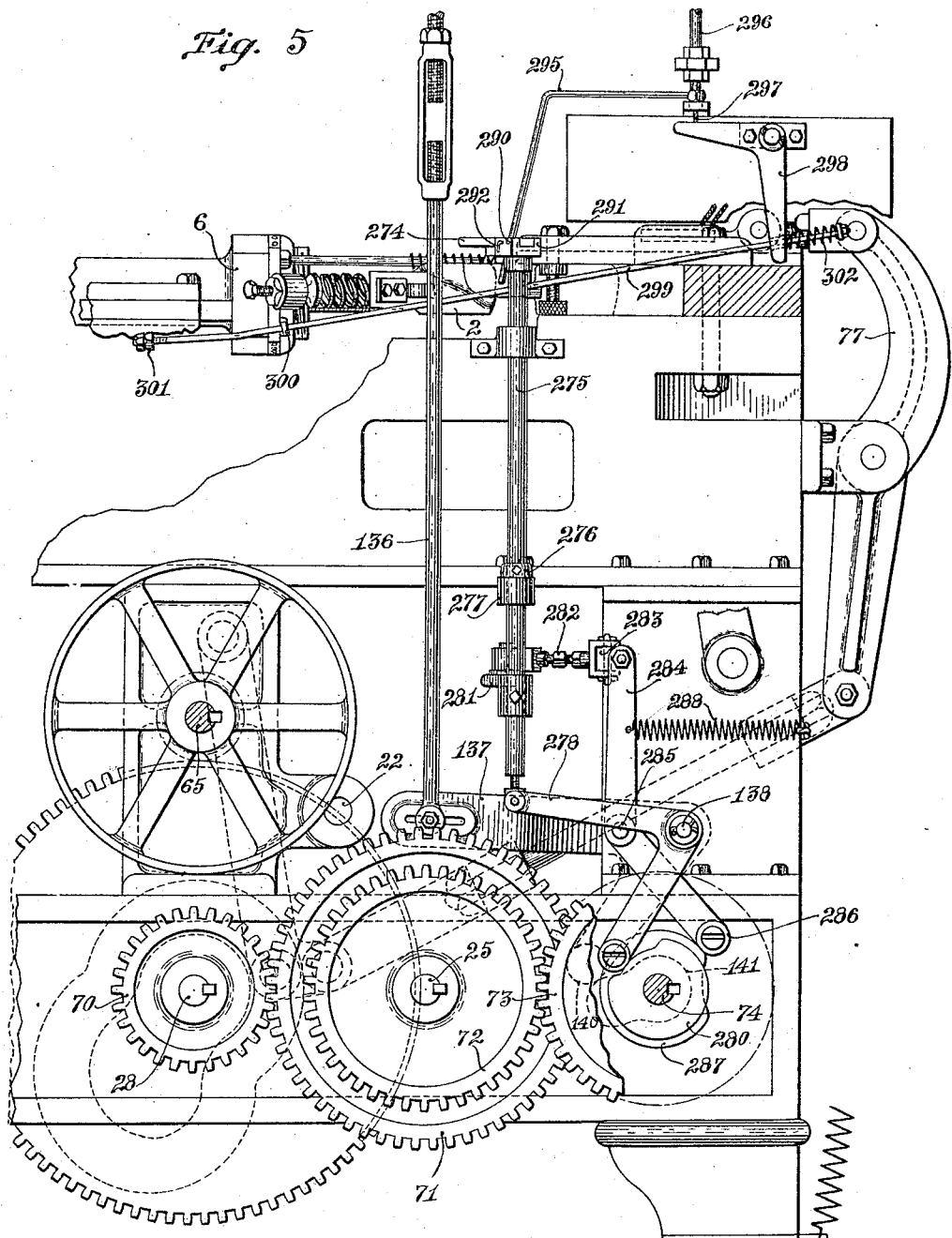

Dec. 2, 1924.
A. E. AYER
1,517,337
AUTOMATIC COUNTER MOLDING MACHINE
Filed Nov. 9, 1921    15 Sheets-Sheet 6
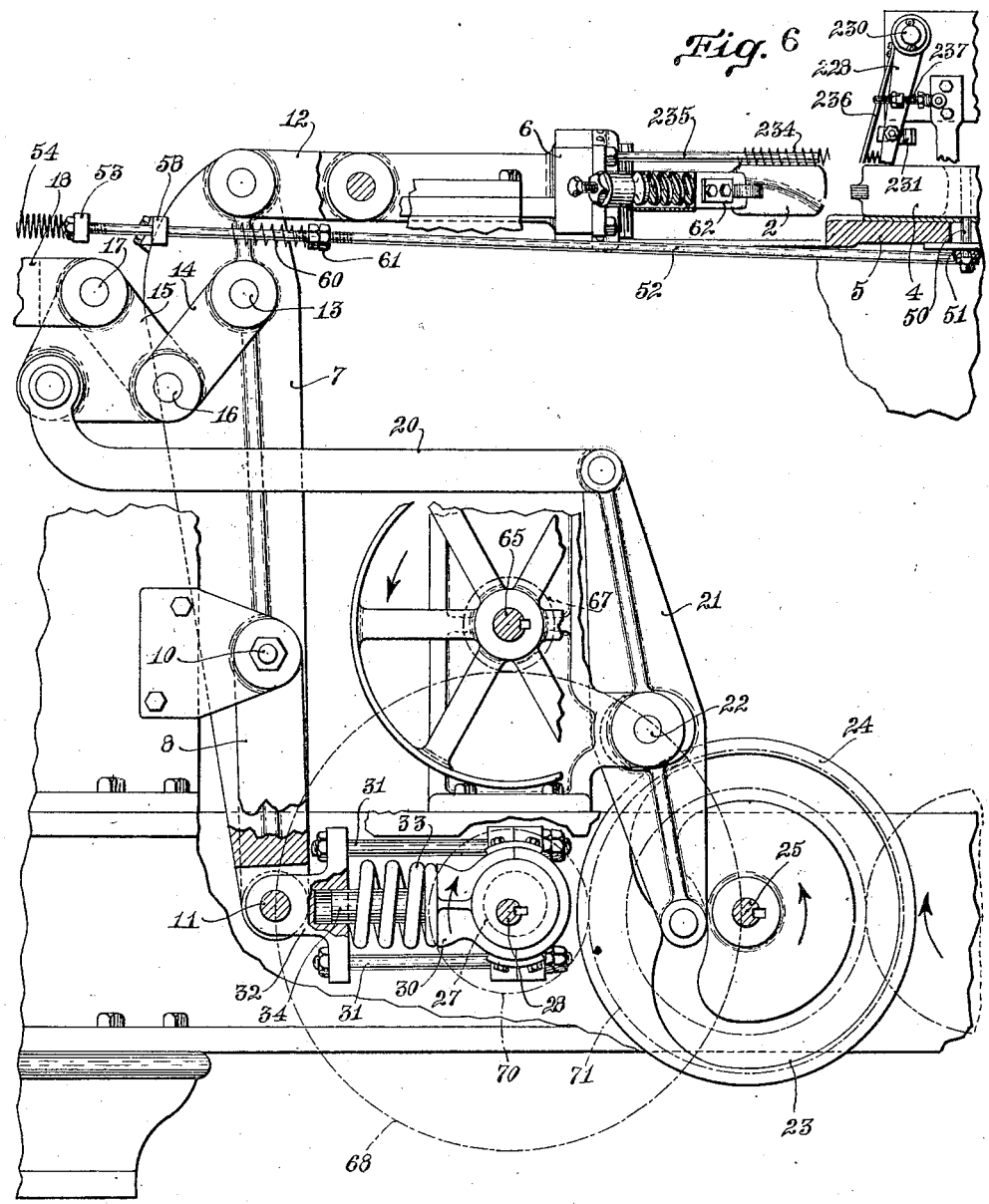
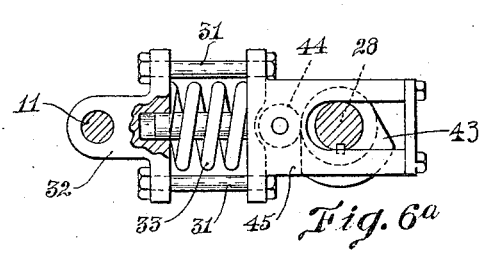
Inventor:
Albert E. Ayer
by J. H. McCrody
his Atty.

Dec. 2, 1924.

A. E. AYER 1,517,337

AUTOMATIC COUNTER MOLDING MACHINE

Filed Nov. 9, 1921  15 Sheets-Sheet 10

Inventor:
Albert E. Ayer
by J. H. McCready
his Atty.

Dec. 2, 1924.
A. E. AYER
1,517,337
AUTOMATIC COUNTER MOLDING MACHINE
Filed Nov. 9, 1921  15 Sheets-Sheet 11
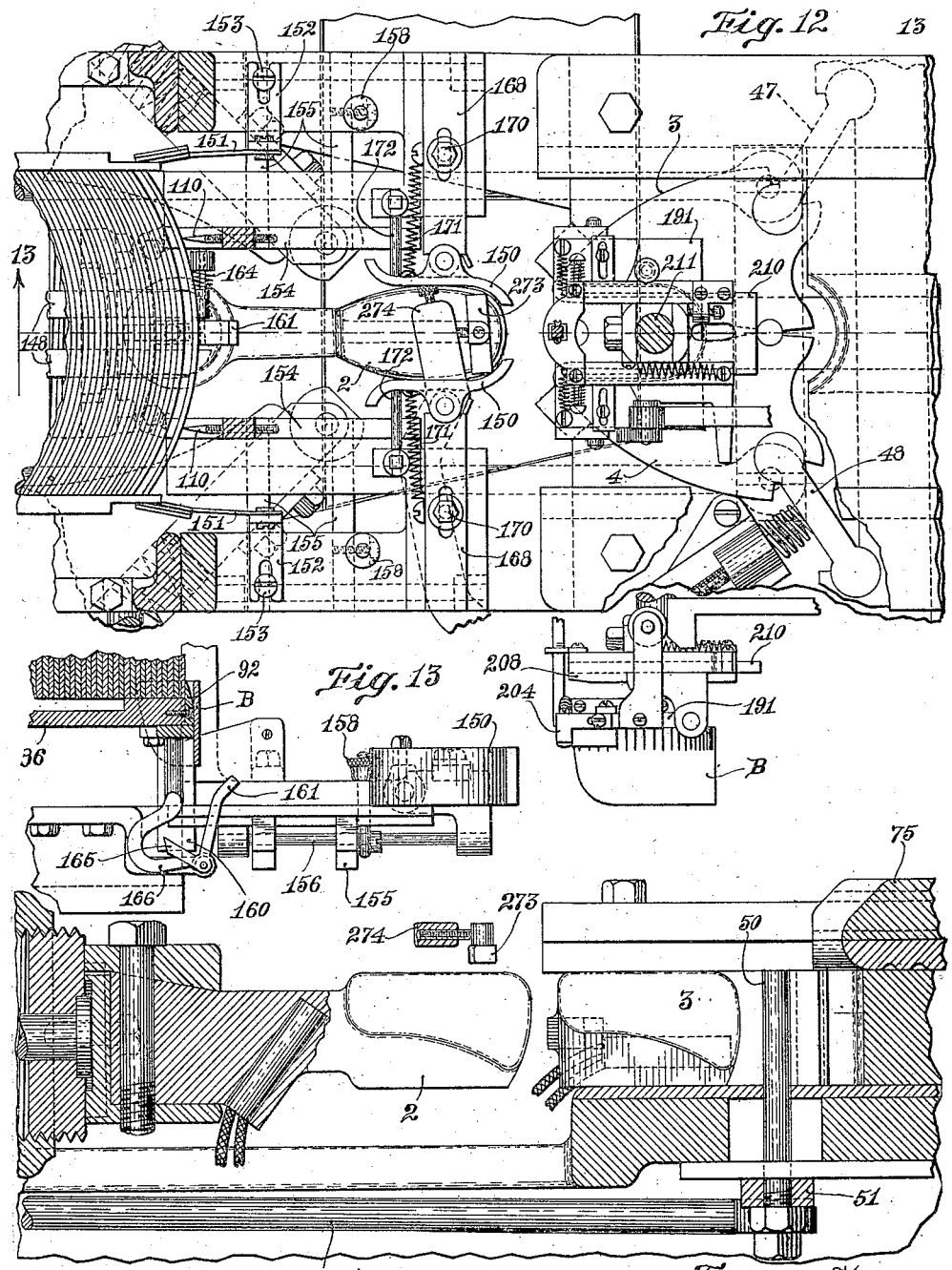

Dec. 2, 1924.
A. E. AYER
1,517,337
AUTOMATIC COUNTER MOLDING MACHINE
Filed Nov. 9, 1921  15 Sheets-Sheet 12
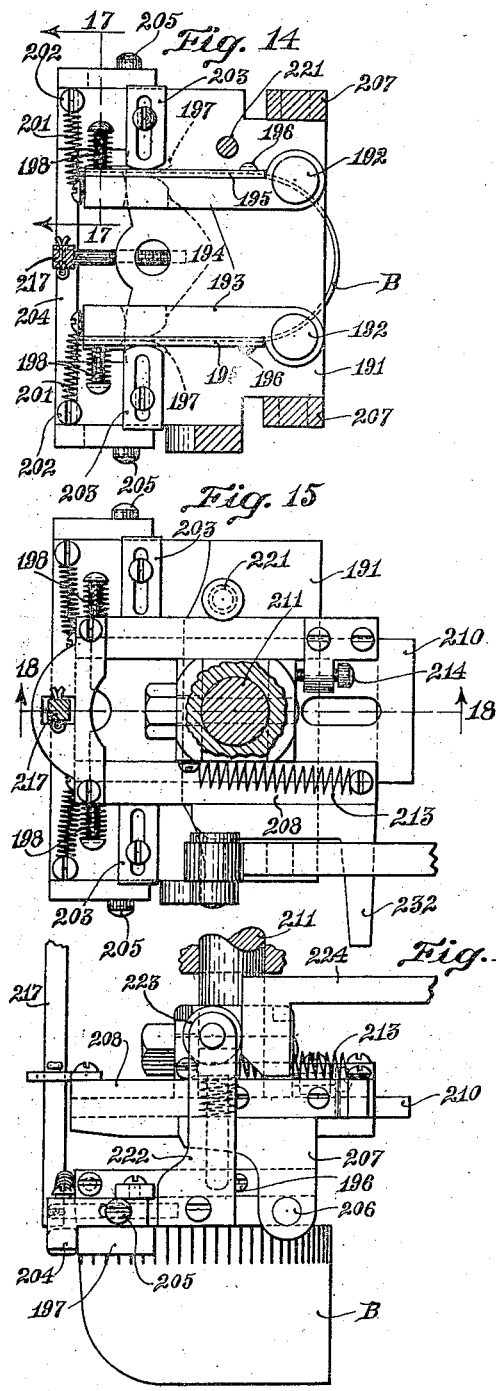
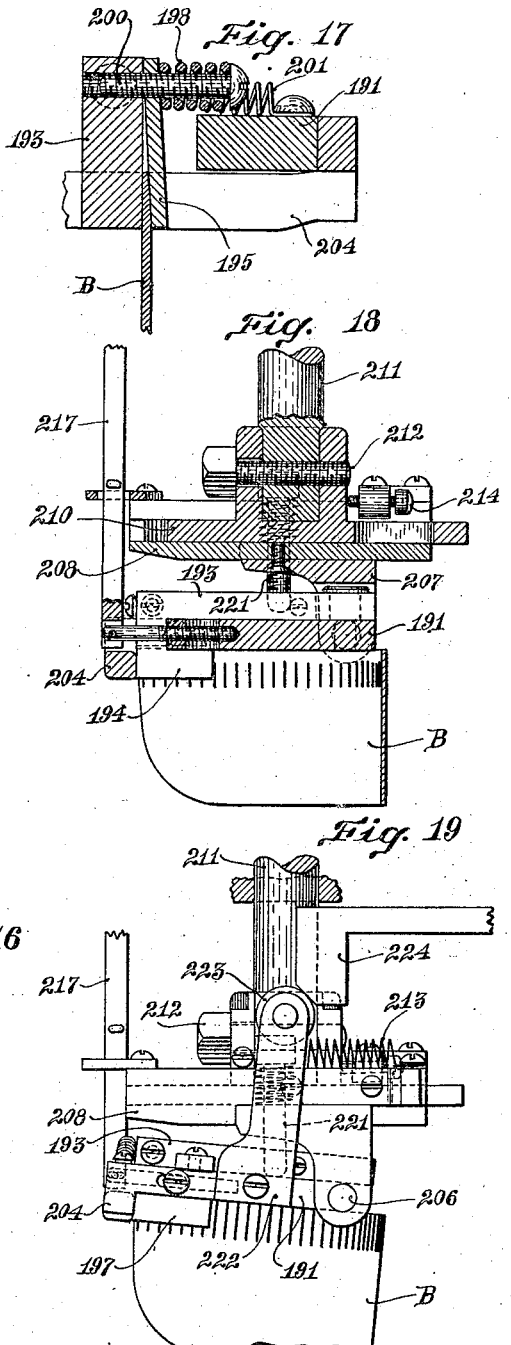

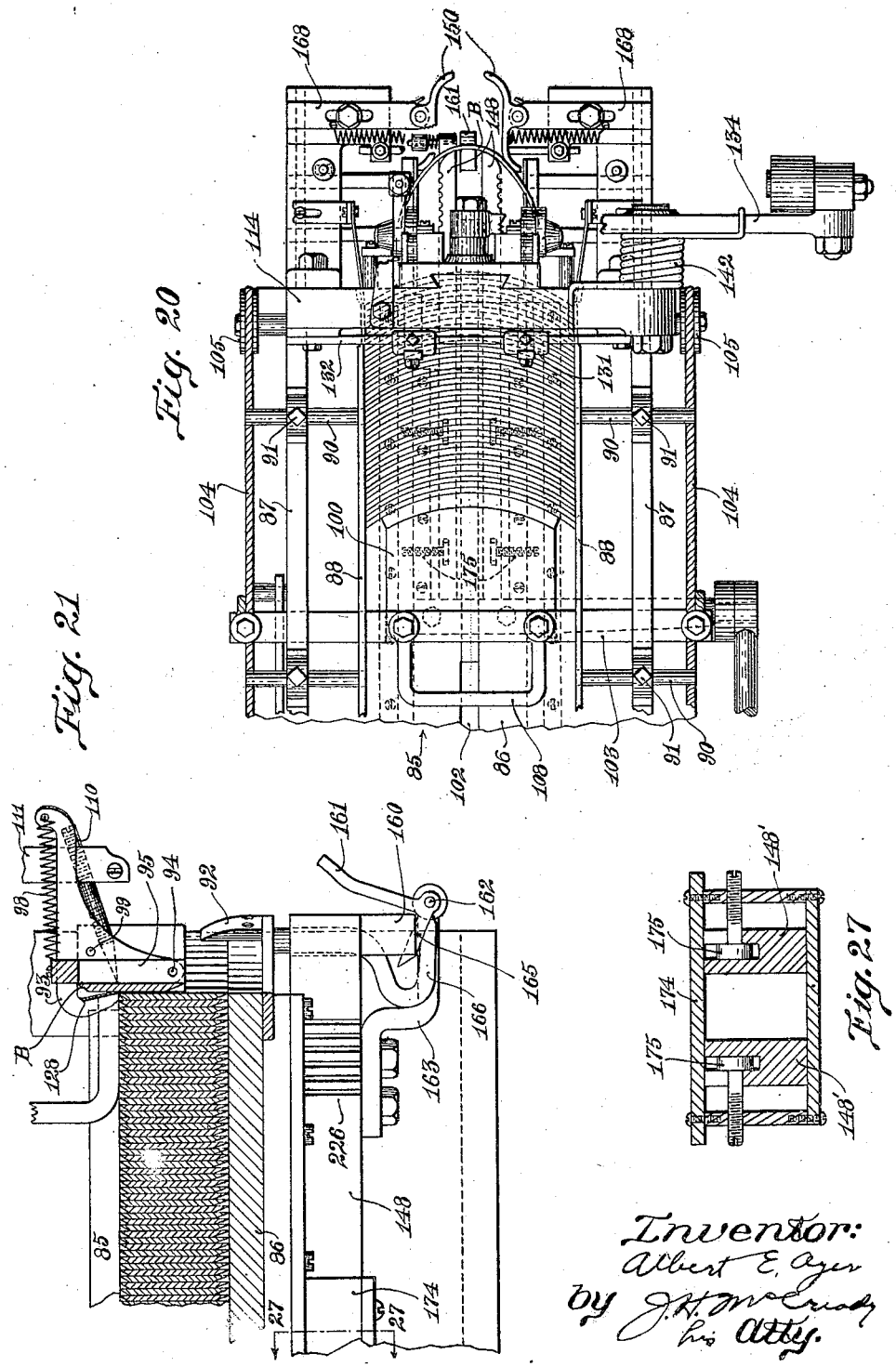
Dec. 2, 1924.
A. E. AYER
1,517,337
AUTOMATIC COUNTER MOLDING MACHINE
Filed Nov. 9, 1921    15 Sheets-Sheet 13

Dec. 2, 1924.
A. E. AYER
1,517,337
AUTOMATIC COUNTER MOLDING MACHINE
Filed Nov. 9, 1921
15 Sheets-Sheet 14
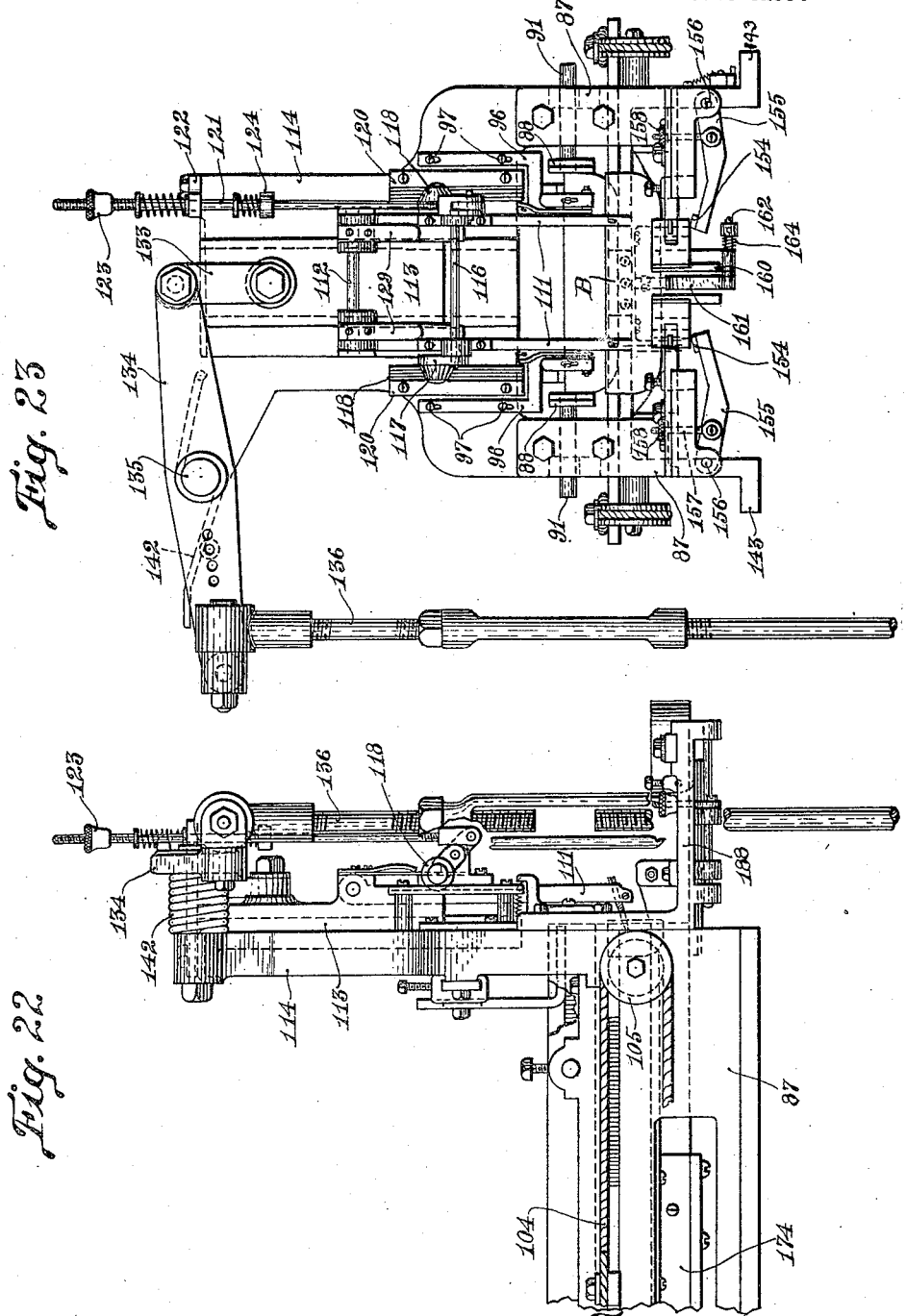
Inventor:
Albert E. Ayer
by J. H. McCrady
his Atty.

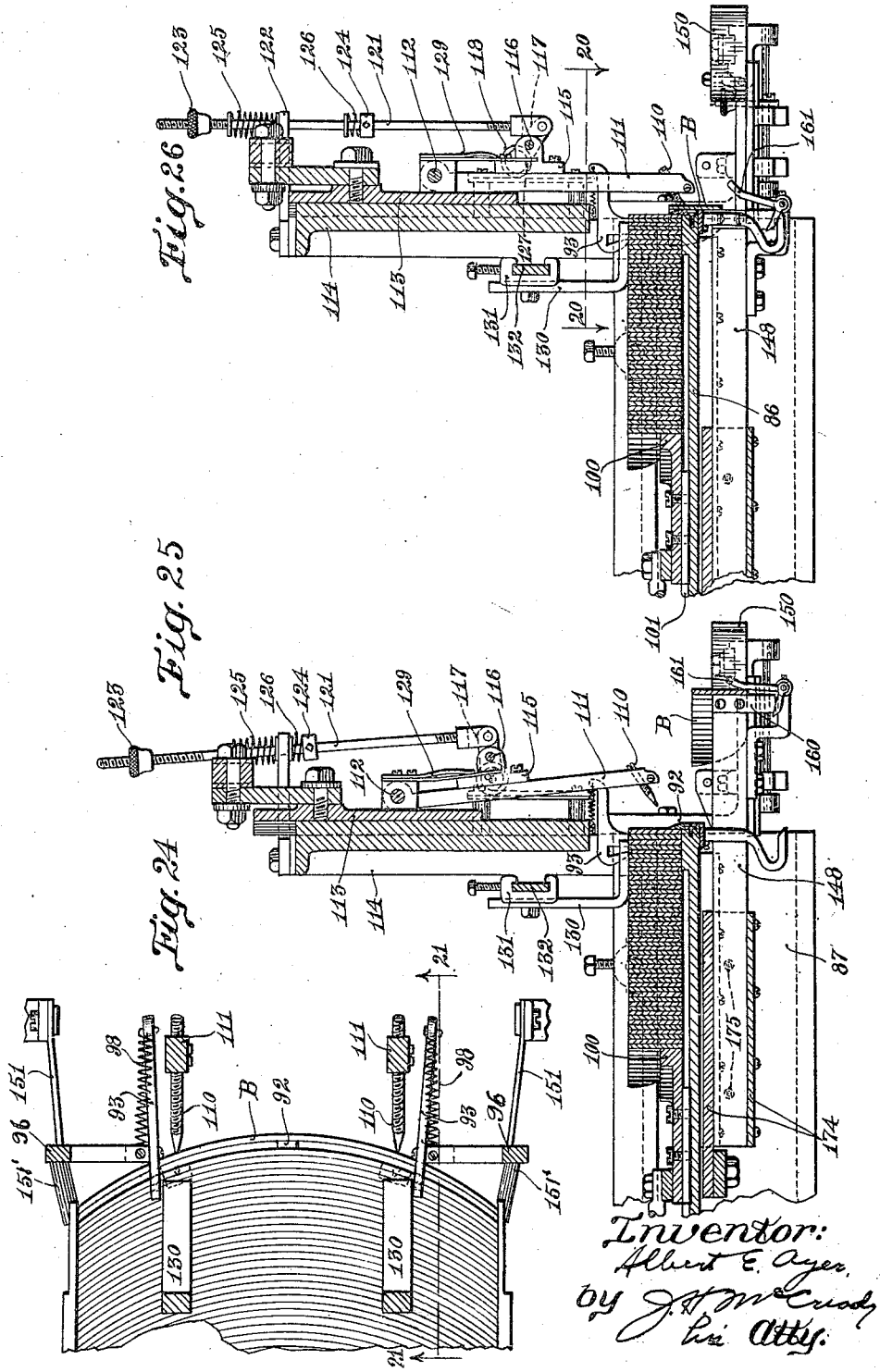

Patented Dec. 2, 1924.

1,517,337

UNITED STATES PATENT OFFICE.

ALBERT E. AYER, OF WINTHROP, MASSACHUSETTS, ASSIGNOR TO W. H. McELWAIN COMPANY, OF BOSTON, MASSACHUSETTS, A CORPORATION OF MASSACHUSETTS.

AUTOMATIC COUNTER-MOLDING MACHINE.

Application filed November 9, 1921. Serial No. 513,910.

*To all whom it may concern:*

Be it known that I, ALBERT E. AYER, a citizen of the United States, residing at Winthrop, in the county of Suffolk and State of Massachusetts, have invented certain new and useful Improvements in Automatic Counter-Molding Machines, of which the following is a specification.

The usual process of molding counter stiffeners, or counters, as they are more commonly called, is performed in two steps. The first consists in feeding a counter blank between rolls of suitable shape to curve the blank both longitudinally and laterally, and at the same time to corrugate the edge which later is to be turned over to form the flange of the counter. This step is usually referred to in the trade as "rolling" or "clamshelling" the blank, and the blank so treated is known as a rolled or clam-shell counter. The next step is that usually referred to as "molding," and consists in shaping the clam-shell counter between molds under heavy pressure and crimping over the corrugated edge of the blank to form the flange. As above stated, this latter operation is ordinarily referred to as the counter molding operation and it is usually performed either in a machine in which the blank is placed by hand in the proper position between the molds, or else in a machine of the type commonly referred to as a semi-automatic counter molder, in which the counter blank is placed by hand in a holder which is subsequently operated automatically to position the blank properly between the molds, a doffing mechanism being provided to remove the counter automatically after it has been molded.

While many attempts have been made heretofore to perform this molding operation entirely automatically, these attempts, so far as I am aware, have not proved commercially successful. Accordingly, it is the general object of the present invention to devise a counter molding machine that will be completely automatic. That is, the invention aims to provide a machine in which it will merely be necessary for an attendant to place the counter blanks in a magazine and to carry the molded blanks away from the machine, all the operations essential to molding being performed automatically.

The invention involves a machine of novel organization and each of the mechanisms that act on the counter is of novel construction. Especially important features of novelty reside in the molding mechanism, in the means that feeds the blanks from the magazine and presents them to the molds, and in the mechanism for removing the molded counters from the machine.

The nature of the invention will be readily understood from the following description when read in connection with the accompanying drawings, and the novel features will be particularly pointed out in the appended claims.

Referring now to the drawings,

Fig. 3 is a horizontal cross sectional view taken substantially on the line 3—3, Fig. 1;

Fig. 4 is an elevation of a portion of the opposite side of the machine from that shown in Fig. 1;

Fig. 4ª is a cross sectional view on the line 4ª, 4ª, Fig. 4.

Figure 1:
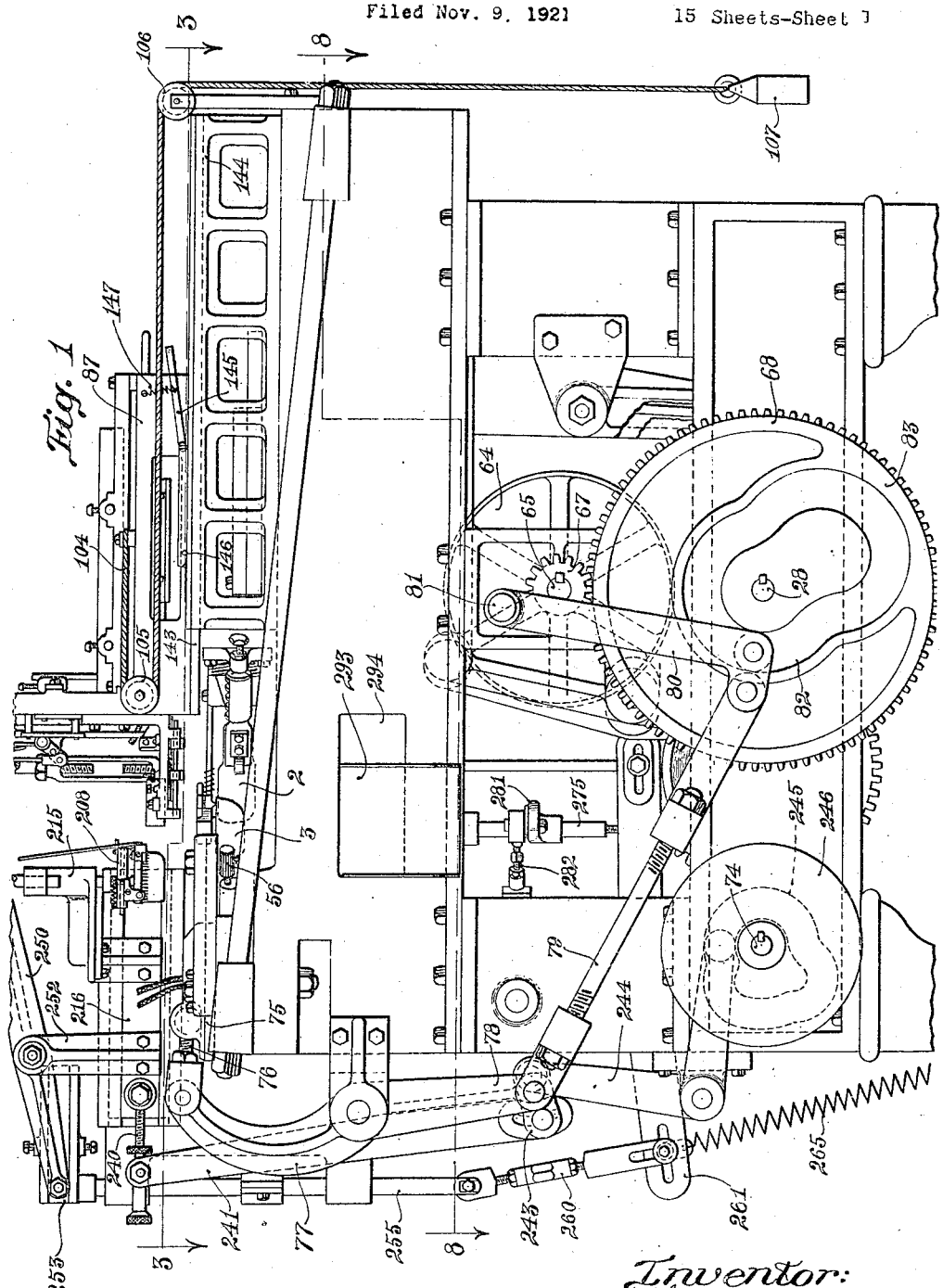
Figure 1 is a side elevation of a machine embodying the invention in the form at present preferred.
Figure 7:
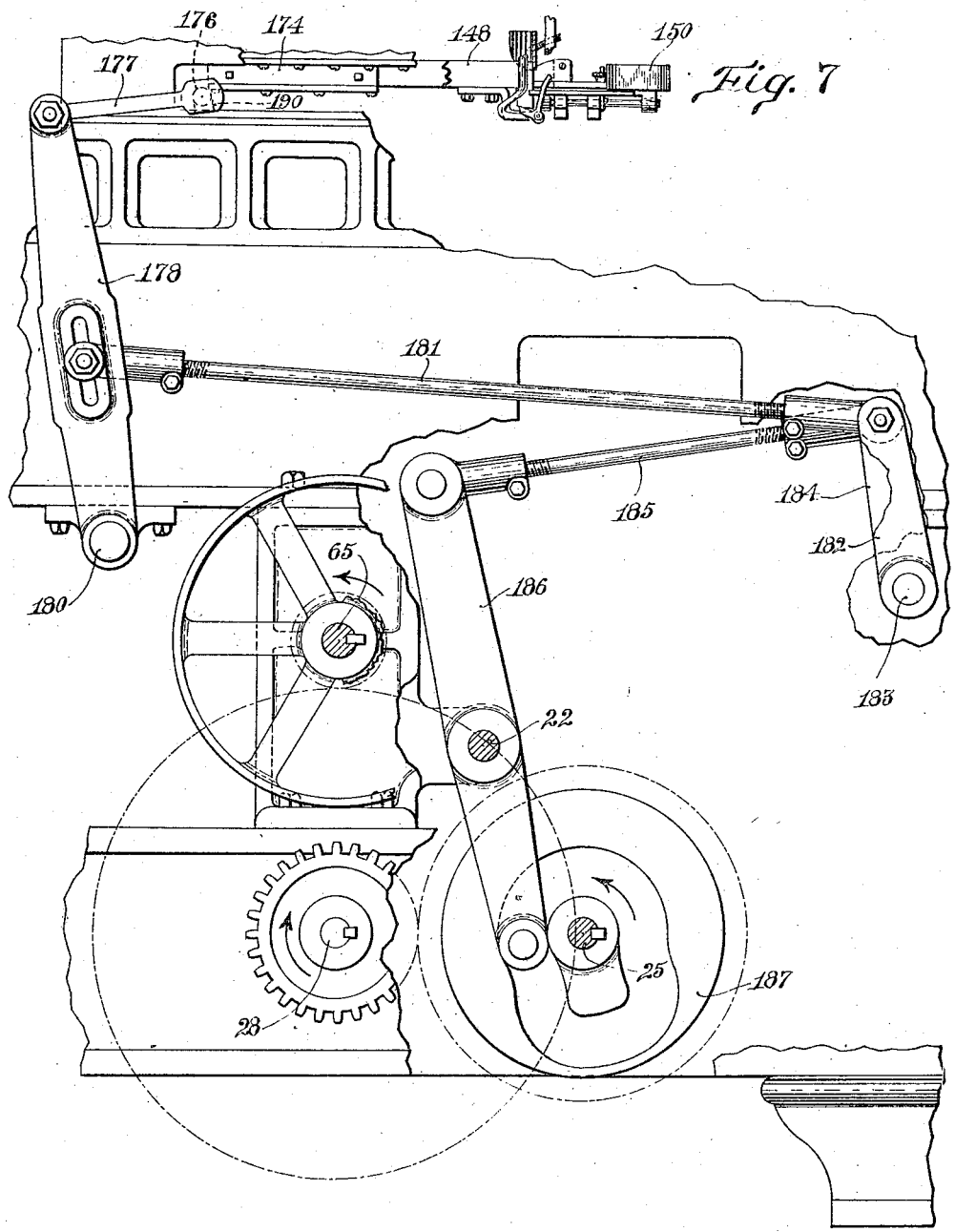
Figure 8:
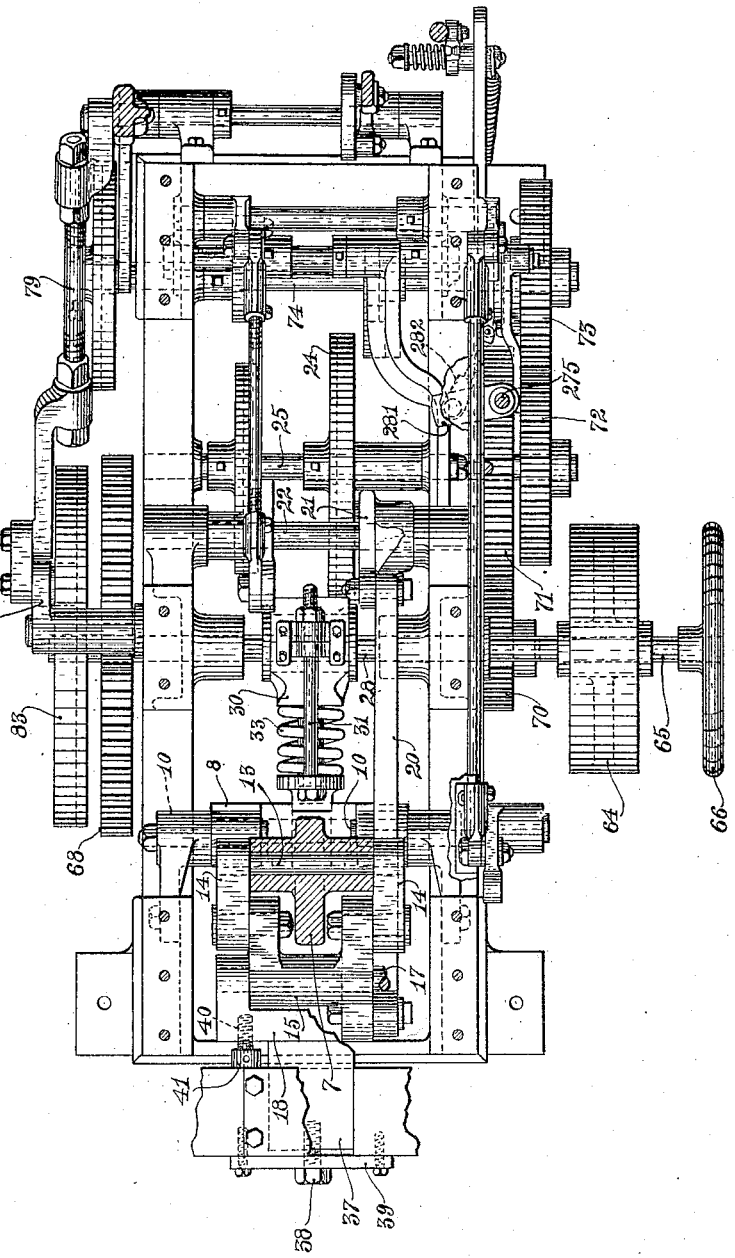
Figure 9:
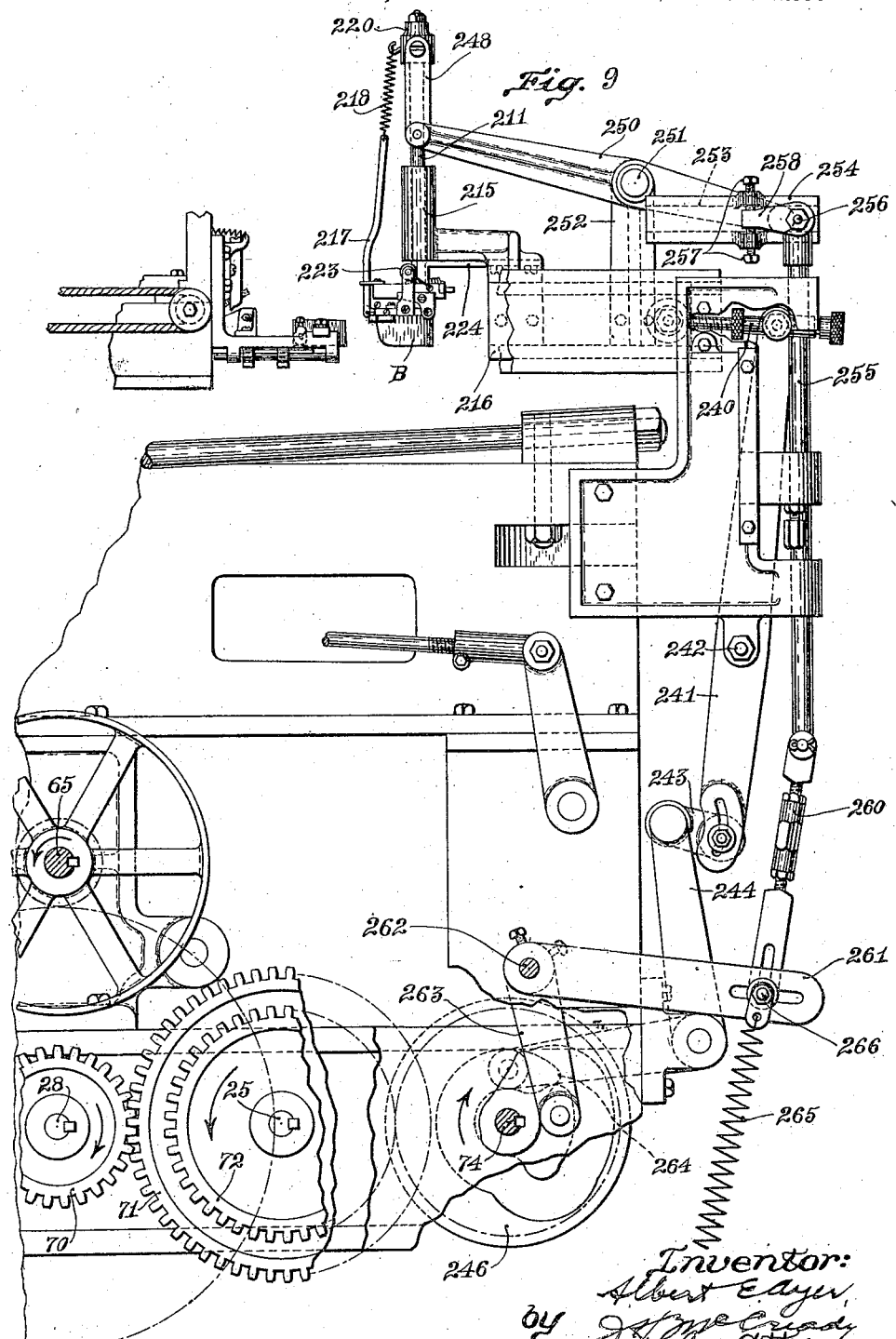
Figure 10:
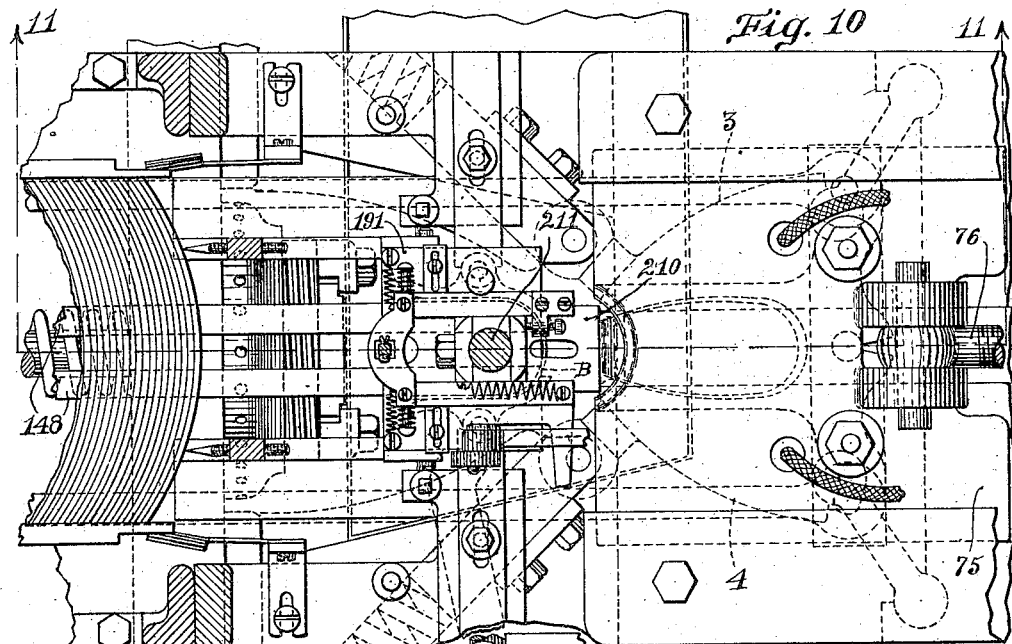
Figure 11:
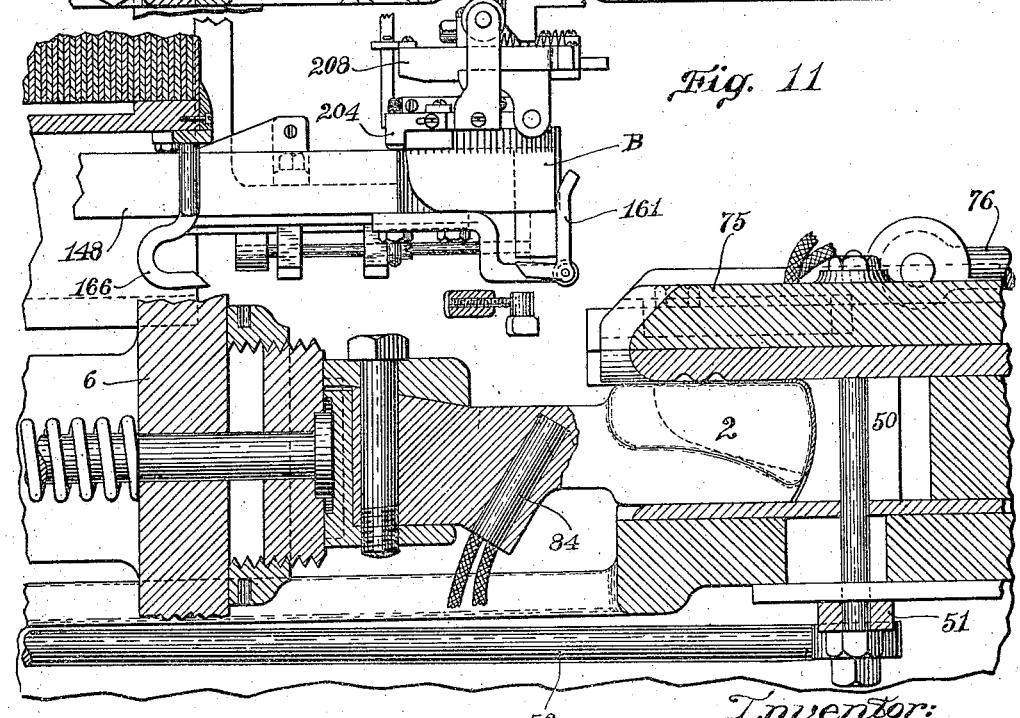

Fig. 5 is a vertical cross sectional view showing details of the operating mechanism;

Fig. 6 is a vertical cross sectional view, partly in side elevation, showing the operating mechanism for the molds;

Fig. 6ª is a side elevation showing a mechanism which is used under some circumstances in place of a portion of the mechanism shown in Fig. 6;

Fig. 7 is a side elevation showing the operating mechanism for the blank bending means;

Fig. 8 is a horizontal cross sectional plan view taken substantially on the line 8—8, Fig. 1;

Fig. 9 is a side elevation showing the mechanism that presents the counter to the molds and the operating means therefor;

Fig. 10 is a plan view showing a portion of the mechanism that holds the bent counter blank and delivers it to the molds;

this figure also showing the relationship of this mechanism to other parts of the machine;

Fig. 11 is a central cross sectional view of the parts shown in Fig. 10;

Fig. 12 is a cross sectional view similar to Fig. 10 but taken on a plane below that of Fig. 10;

Fig. 13 is a cross sectional view on the line 13—13, Fig. 12;

Fig. 14 is a view of the lower part of the counter holder;

Fig. 15 is a top view of the counter holder;

Fig. 16 is a side elevation of the counter holder;

Fig. 17 is a cross sectional view on the line 17—17, Fig. 14;

Fig. 18 is a cross sectional view on the line 18—18, Fig. 15;

Fig. 19 is a side elevation of the counter holder showing the position in which it supports the counter while it is carrying the counter blank into the molds;

Fig. 20 is a plan view of the magazine for the counter blanks and parts immediately associated therewith;

Fig. 21 is a vertical cross section through the parts at the front of the magazine;

Fig. 22 is a side elevation of the magazine and the parts immediately in front thereof;

Fig. 23 is a front elevation of the parts shown in Fig. 22;

Fig. 24 is a plan view, partly in cross section, illustrating the manner in which the endmost counter blank in the magazine is separated and fed out of the magazine;

Figs. 25 and 26 are cross sectional views through the front of the magazine and adjacent parts showing different steps in the process of feeding a counter blank; and Fig. 27 is a cross sectional view on the line 27—27, Fig. 21.

The machine shown in the drawings comprises counter shaping molds and operating mechanism therefor, a magazine to hold a supply of counter blanks, mechanism for feeding the blanks one at a time out of the magazine, a bending mechanism into which the blanks are delivered by said feeding mechanism and which bends each blank so delivered into a U-shape, a holder which receives the bent blank, holds it in its bent position, and delivers it in the proper position between the molds, and a doffing or ejecting mechanism which discharges each counter from the machine after it has been molded. The detailed description of these various mechanisms will be taken up substantially in the order in which they have just been mentioned.

Referring particularly to Figs. 3 and 6, it will be seen that the molding mechanism includes a male mold 2 and two female molds 3 and 4, respectively, these molds being of the usual construction. The female molds 3 and 4 rest on a plate-like portion 5 of the machine frame, and they are arranged to swing toward and from each other and also to have a limited movement in a horizontal plane toward and from the male mold. The male mold 2 is movable toward and from the female molds, and for this purpose it is mounted on a cross-head 6 which is supported in horizontal ways so that it can slide toward and from the female molds. The mounting of the male mold on the cross-head is substantially the same as that used in the present commercial machines and need not be described in detail. This mounting permits the adjustment of the male mold toward and from the female molds in the usual manner.

For the purpose of producing the operative movement of the molds, a mechanism is provided which relatively moves the molds into molding relationship and an additional mechanism then applies the molding pressure to the molds. The first of these mechanisms comprises a powerful lever 7 mounted vertically in the machine, the weight of this lever being supported chiefly by a U-shaped shackle or stirrup 8 pivoted on the machine frame at 10. The lower end of the lever 7 is connected to the stirrup by a pivot pin 11 while the upper end of the lever is connected by a link 12 to the cross-head 6. The fulcrum of the lever 7 consists of a pivot pin 13, Figs. 6 and 8, and this fulcrum is moved at certain times by cam operated connections acting through toggle links 14 and 15 which are connected by the knuckle joint 16. The link 14 swings on the fulcrum 13 while the link 15 swings on a pivot 17 supported in a stationary but adjustable bracket 18. The link 15 is formed as a bell crank lever and is connected by a curved link 20, Figs. 6 and 8, with the upper end of a lever 21 fulcrumed on the shaft 22, and carrying a roll at its lower end which runs in the cam path 23 of a cam 24 mounted fast on the cam shaft 25.

This mechanism operates at certain times to straighten the toggle and relatively move the molds into molding relationship. In this relationship they grip a counter blank, but they are not forced together with sufficient pressure to mold the counter properly. While the molds are thus held in this relationship, however, another mechanism acts on the lever 7 to apply the molding pressure. This mechanism comprises an eccentric 27 fast on the shaft 28, Fig. 6, this eccentric being enclosed in a heavy eccentric strap 30. Two rods 31—31 connect the strap 30 with a yoke 32 which is joined to the lower end of the lever 7 by the pivot pin 11. A heavy compression spring 33 is interposed between the eccentric strap 30 and the yoke 32 and surrounds a stud 34 that extends from the eccentric strap 30 and projects into an aperture formed in the yoke 32. The parts 31—31 and 34 thus serve as guides, and the rods 31—31 serve particularly to limit the movement of the yoke 32 away from the eccentric strap 30 under the influence of the spring 33.

As the shaft 28 revolves, carrying the eccentric 27 with it, the eccentric compresses the spring 33 at certain points in its rotation, and this movement is transmitted by the spring to the lower end of the lever 7. The toggle 14—15 at this time being straightened, the lever swings about the fulcrum 13 in a clockwise direction, Fig. 6, and thus moves the male mold forward into the female molds, applying a very heavy pressure to a counter placed between the molds. The amount of pressure so applied can be varied by adjusting the male mold on the cross-head 6 in the usual manner.

For the purpose of facilitating the initial adjustment of the mechanism, the bracket 18 is mounted for adjustment toward and from the fulcrum 13. That is, this bracket has an extension 37, Figs. 3 and 8, which is supported in a horizontal guideway formed in the machine frame, and a bolt 38 threaded into this extension and bearing against a plate 39 secured to the rear of the frame, serves to draw the bracket 18 backwardly. This bracket also has two threaded studs 40—40 secured fast therein and carrying nuts 41—41 which bear against a part of the frame. By loosening the bolt 38 and turning the nuts 41—41 in the proper direction, the bracket 18 may be moved backward or forward relatively to the lever 7.

Under many conditions I prefer to replace the eccentric 27 with a cam, and such an arrangement is shown in Fig. 6a, the shaft 28 having a cam 43 fast thereon and acting on a roll 44 mounted in a cam follower 45 which is connected with the yoke 32 by rods 31—31 and a spring 33, in the same way that the eccentric strap 30, Fig. 6, is connected with the yoke 32. This arrangement has the advantage of maintaining the molding pressure on the molds for a longer period of time than the eccentric, this period of time being determined by the shape of the cam 43.

The movement of the lever 7 is utilized in a novel manner to move the female molds toward and from each other. Referring to Fig. 3, it will be seen that the female molds 3 and 4 are provided with sockets to receive the ends of struts 47 and 48, respectively, the opposite ends of these struts being mounted in similar sockets provided in stationary members secured to the machine frame. The molds also are formed at their meeting faces with semi-circular grooves to receive a hinge or pivot pin 50 which extends upwardly from a yoke or bar 51, Figs. 3 and 6, lying immediately below the female molds. Two rods 52—52, running endwise of the machine are connected at their rearward ends, by another bar 53 which is connected by a spring 54 to an eyebolt 55 adjustably secured to the machine frame. This spring 54 thus acts through the connections just described to pull the pivot pin 50 toward the male mold, and this movement tends to swing the molds 3 and 4 away from each other. The swinging movement so produced is limited by stop screws arranged to engage the struts 47 and 48, one of these stop screws being shown at 56 in Fig. 3. A coiled spring 57 located immediately under the stop screw bears against the strut 47 and acts on the strut in a direction to swing the mold 3 open. A similar arrangement is provided for the strut 48. These springs thus cooperate with the spring 54 to hold the female molds open. When the toggle 14—15 is straightened, a bar 58, Fig. 6, which is bolted to the lever 7 and through which the rods 52—52 extend, engages springs 60 encircling these rods pushing them against stop nuts 61 and thereby forcing the pin 50 yieldingly backward away from the male mold. This movement swings the female molds 3 and 4 toward each other into cooperative relationship to the male mold. The cross-head 6 also carries the usual spring pressed plungers 62—62 which act on the forward ends of the female molds to press them against the male mold.

It will now be appreciated that this invention provides an exceptionally sturdy, powerful operating mechanism for the molds. The connections through which the female molds are moved toward and from each other also have the advantage of avoiding the use of friction mechanisms which have heretofore been employed.

The mechanism for driving the cam shafts 25 and 28, above mentioned, comprises a pulley 64, Figs. 1, 3, 4, 6 and 8, loosely mounted on the shaft 65 but arranged to be connected thereto by a clutch (not shown), a hand wheel 66 also being mounted fast on this shaft. A pinion 67 Figs. 1 and 6, fast on the shaft 65 drives a gear 68 fast on the shaft 28. At the other side of the machine the shaft 28 carries a pinion 70, Fig. 4, meshing with a gear 71 mounted fast on the cam shaft 25. This shaft also carries another gear 72 driving a gear 73 fast on a cam shaft 74 lying in front of, and parallel to, the shaft 25.

A wiper plate 75, Figs. 1 and 3, is mounted in suitable ways to reciprocate over the upper faces of the molds when they are in molding relationship and to crimp over and iron down the flange of the counter. This plate is connected by an adjustable link 76 to one arm 77 of a bell crank lever, the other arm 78 of which is connected by an adjustable link 79 to a lever 80 fulcrumed on the machine frame at 81 and carrying a cam roll that runs in a path 82 formed in a cam 83 fast on the shaft 28. This mechanism thus reciprocates the wiper place 75 backward and forward in the desired timed relationship to the movement of the molds, and the gear ratio preferably is such that the wiper makes two reciprocations over the flange of each counter. If desired, the molds or the wiper plate, or all of these parts, may be electrically heated, and heating apparatus is indicated diagrammatically in the drawings, the heating unit for the male mold being shown at 84, Fig. 11.

The supply of counter blanks to be molded is held in a magazine indicated in general at 85, and a picker mechanism is provided to feed these blanks out of the magazine one at a time. This mechanism may be constructed in the manner shown and described in my pending application Serial No. 315,844 filed August 7, 1919, and when the machine is used to mold leather counters this picker mechanism preferably is employed. In molding leather board counters, however, I prefer to modify this mechanism in accordance with the present disclosure. The counter blanks are stacked on their edges face to face, as clearly shown in Figs. 20 to 26. The magazine comprises a horizontal bottom 86 and two side members 87—87. Between the side pieces are mounted two adjustable side plates 88—88 each having a pair of pins or rods 90 fixed thereto and projecting through holes formed in the side members 87. Set screws 91 arranged to bear against these rods secure the side plates 88—88 in their adjusted positions and enable the plates to be adjusted toward and from each other to accommodate blanks of different lengths.

At the forward or delivery end of the magazine the counters bear against a central abutment 92 and against the rearward edges of two stops 93—93, thus forming a three point bearing that retains the blanks in their longitudinally curved condition. The middle abutment 92 is bevelled at its upper edge, as shown in Figs. 21 and 25, and is secured rigidly to the bottom 86 of the magazine. The two members 93, in addition to performing the functions of abutments, also assist in the separating operation and may therefore be termed separators. These two members are mounted exactly alike so that the description of the supporting means for one will suffice for both. Referring to Figs. 21 and 23 it will be seen that the separator 93 is pivoted at 94 to the lower end of a block 95 which is adjustable vertically in a support 96, Fig. 23, which also is adjustably secured by screws 97 to a part of the feeder frame. A spring 98, Fig. 21, acts on the separator 93 to hold it normally in the position there shown, but permits it to tip in a clockwise direction about the pivot 94, the normal position of this member being determined by a stop 99. The endmost counter bears against the rigid blocks 95—95 as well as against the separators.

A follower backs up the stack of blanks and consists of a block 100 having a tongue 101 that slides in a groove 102 formed in the upper surface of the bottom 86 of the magazine. A bar 103 secured to the follower 100 extends through the slots in the opposite side members 87—87 and has two flexible cords or chains 104—104 connected to its opposite ends and running over pulley 105—106, Fig. 1. Each of these cords supports a weight 107 and this weight serves to draw the follower forward and force the stack of blanks against the abutments or stops at the forward end of the magazine. In order to withdraw the follower whenever it is necessary to replenish the supply of blanks in the magazine, a bail or handle 108, Fig. 20, is secured to the bar 103 where it can conveniently be grasped by the attendant.

The picker mechanism which feeds the counter blanks out of the magazine comprises two pickers 110—110 mounted in the lower ends of picker bars 111—111. These bars are supported on the opposite ends of a pivot 112, Figs. 23 and 25, which is carried by a slide 113 mounted in vertical ways formed in a bracket 114 that is secured rigidly to the side pieces of the magazine. Each picker bar carries a small bracket 115 bolted rigidly thereto and these two brackets form a bearing for a rock shaft 116. At opposite ends of this rock shaft are fixed two arms 117—117 carrying conical rolls 118—118 which run, respectively, on bevel plates 120—120 secured to opposite sides of the bracket 114. A rod 121 pivoted to one of the brackets 117 extends upwardly through a hole formed in a stationary plate 122 secured to the upper end of the bracket 114. A thumb screw 123 is adjustably threaded on the upper end of the rod 121, and a collar 124 is secured to this rod below the plate 122. Preferably light coiled springs 125 and 126, respectively, encircle the rod above and below the plate 122. Two pairs of flat springs 129 are secured to the slide 113 and bear, respectively, against pins, one of which is shown at 127, Fig. 26, and which project from the brackets 115.

Assuming now that the slide 113 is moving upwardly, it will be evident that the picker bars 111 must move upwardly with it. If the rocker arms 117 at this time are standing at right angles to the picker bars, they will hold the bars, and consequently the pickers, at a certain distance away from the face of the endmost blank in the magazine 85. As the slide 113 approaches the upper limit of its stroke, the spring 126 will strike the lower side of the plate 122 and thus yieldingly prevent the rod 121 from being raised further. The slide 113, however, will continue to move upwardly, thus carrying the rock shaft 116 with it, and this motion will swing the arms 117 into an inclined position, as shown in Fig. 22, and thus permit the springs 129 to force the picker bars and the pickers inwardly, jabbing the points of the pickers into the face of the endmost blank in the magazine. As the slide 113 continues to move upwardly, the engagement of the pickers with the blank will lift the blank far enough to carry its lower edge above the upper edge of the abutment 92, the upper edge of this blank being carried upwardly into the notches or slots 128 formed in the separators 93. This relationship is best illustrated in Fig. 21, in which the blank B has been moved into the position just described. The lower end of each of the slots 128 is just wide enough to take one blank so that there is no possibility of separating more than one blank from the stack. As an additional means for ensuring the separation of but a single blank, two L-shaped presser devices 130 are arranged to bear on the upper edges of the blanks at the forward part of the magazine, these devices being bolted to clamps 131, Fig. 25, which are secured to a bar 132 bolted to the bracket 114. As soon as the blank B has been moved into the position shown in Fig. 21, the follower 110 pushes the stack of blanks forward, the springs 98 yielding at this time, thus carrying the lower edge of the blank B over the upper edge of the abutment 92. This abutment of course limits the forward movement of the stack. The next movement of the slide 113 is downward, and during this movement the pickers 110 carry the blank B downwardly out of the magazine. When the pickers arrive at a point near the lower limit of their stroke, the thumb nut 123 strikes the upper end of the spring 125 and yieldingly checks the downward movement of the rod 121. The slide 113, however, continues to move downwardly, carrying the rock shaft 116 with it, and thus moves the rocker arms 117 into their straightened or right angle position again, as shown in Fig. 25, and swinging the pickers out of engagement with the face of the blank B. When the slide 113 rises again, the rocker arms 117 are still held in their straightened positions until they are tipped downwardly in the manner above described.

For the purpose of giving the slide 113 the up and down movement above mentioned, it is connected by a link 133, Fig. 23, to one end of a lever 134 fulcrumed at 135, the opposite end of this lever being connected by a link 136 to one arm 137, Fig. 5, of a bell crank lever which is fulcrumed on a rod or pivot 138. The opposite arm of this lever carries a roll 140 which runs on the surface of a cam 141 mounted fast on the shaft 74 above referred to. This cam produces the downward movement of the slide 113, but the upward movement of this slide is produced by a strong spring 142 coiled around the pivot 135.

The magazine is positioned directly over parts of the machine to which access is desirable at times to make adjustments or repairs, and in order to facilitate such operations the entire magazine is mounted to slide horizontally on the machine frame. That is, each of the side pieces 87—87 is provided with an outturned flange 143, Figs. 1 and 23, and these flanges are supported in ways formed in frame members 144. A latch 145, Fig. 1, pivoted to one of the side members 87 normally engages a stationary pin 146 and holds the magazine in its normal or operative position, a spring 147 acting on the latch to retain it in the position shown in Fig. 1. By releasing this latch, however, the entire magazine may be pushed backwardly toward the right, Fig. 1, so as to afford free access to the parts lying under the normal position of the magazine. It will be noted that the connections between the slide 113 and the cam 141 that operates this slide are such as to permit this movement of the magazine.

The mechanism that feeds the counter blanks out of the magazine delivers these blanks to a bending mechanism which comprises a plunger 148 and two curved folders 150—150, see Fig. 12. As the pickers carry the blank B downwardly to present it to the bending mechanism, the opposite ends of the blanks are brought into contact with two leaf springs 151—151, see Figs. 12 and 24, each having an end portion 151' extending upwardly and outwardly. These parts, therefore, operate to center the blank. Each leaf spring 151 is mounted on a slidable holder 152, Fig. 12, which is adjustably secured to a stationary part of the frame by a screw 153. The counters drop on two spaced horizontal rails 154—154, Figs. 12 and 23, each rail being supported by a pair of arms 155 mounted to swing on the stationary pivots 156. An eye bolt 157 pivoted to one arm of each pair extends up through a stationary part of the frame and has a thumb nut 158 threaded thereon, by means of which the vertical position of the rails may be adjusted.

The plunger 148 is mounted horizontally immediately below the magazine 85 and it consists of two parallel bars spaced apart. At its forward end it has fixed thereto two depending pieces 160—160, one for each bar, which serve to give the plunger an end face of increased depth. The counter blank B is fed down immediately in front of the end of this plunger, as shown for instance in Figs. 13, 21 and 26, and a yielding finger 161 is arranged to cooperate with the plunger to grip the counter at the central portion thereof. This finger is pivoted at 162 on the end of a bracket 163 bolted to the lower face of the plunger 148, and a spring 164, Figs. 12 and 23, coiled about the pivot 162 tends to swing the finger into an upright position. When the plunger is withdrawn, however, as shown for instance in Figs. 13 and 21, an extension 165 of the finger is engaged by a stationary part 166 and tips the finger outwardly into a position affording a free space between the end of the plunger and the finger to receive the counter blank. As soon as the plunger starts to move forward, however, the extension 165 is moved out of engagement with the stop 166, and the spring 164 then acts through the finger 161 to press the central portion of the counter blank firmly against the forward end of the plunger.

While the counter blank is held in this manner, it is carried forward by the plunger between the folders 150—150, the lower edge of the blank riding on the rails 154—154 during this movement. Each of these folders is pivoted to a slide 168 which is normally stationary, the two slides, however, being adjustable toward and from each other and being secured in their adjusted positions by bolts 170. Springs 171—171 act on the respective folders to hold them normally in the positions shown in Fig. 12, these positions being determined by adjustable stops 172—172. As the plunger carries the blank forward it is engaged near its opposite ends by the folders 150—150, and as the plunger continues to advance the folders press the legs of the counter blank against the sides of the plunger bending it into a U-shape, as will be apparent, and as indicated in dotted lines at B, Fig. 10.

It is necessary, or at least desirable, to have the distance between the legs of the counter at this time somewhat greater than the width of the male mold, and since male molds of various widths are used, it is desirable to be able to adjust the width of the plunger 148. It is for this purpose that the plunger is made in two parts indicated, respectively, at 148', Fig. 27. These parts are mounted snugly in a hollow frame or slide 174, and each of the bars 148' is slotted to receive the head of a screw 175, the stems of the respective screws being threaded through the opposite side pieces of the frame 174, as shown in Figs. 20 and 27. By turning the screws in the proper direction the bars 148' may be moved toward or from each other to adjust the effective width of the plunger.

The operating mechanism for the plunger 148 is best shown in Fig. 7, and it comprises a bar secured to the frame 174 and having a pin 176 projecting at one side of the frame. A link 177 connects this pin with the upper end of a lever 178 which is fulcrumed at 180 and is adjustably connected by another link 181 to an arm 182 fast on a rock shaft 183. Another arm 184, fast on this rock shaft, is connected by an adjustable link 185 to one end of a lever 186 which is fulcrumed on the stationary shaft or rod 22. The other end of this lever carriers a roll running in a cam path formed in a cam 187 secured fast to the shaft 25. It will be noted that the entire bending mechanism is supported by the frame of the magazine, the frame 174 for the plunger 148 being mounted on guide pieces secured to the lower side of the magazine floor, while the folders and their associated parts are supported by brackets, one of which is shown at 188, Fig. 22, these brackets being bolted to the opposite sides of the frame member 114. In order to enable the magazine to be moved backwardly out of its operative position, as hereinbefore described, the link 177, Fig. 7, is slotted, as shown at 190, to receive the pin 176. Consequently, it is merely necessary to swing the link 177 in a clockwise direction about its connection with the lever 178 in order to disconnect it from the plunger 148. When this has been done the magazine may then be moved back to its inoperative position.

While the counter blank is held in its bent condition by the bending mechanism, it is operatively engaged by a holder which subsequently is moved to carry the blank out of the bending mechanism and deliver it between the molds of the machine. The construction of this holder is best shown in Figs. 14 to 19 inclusive. It should be noted that the counter blanks are fed downwardly out of the magazine with their curved edges foremost, the straight edge which later is to be turned over to form a flange being uppermost. The counter holder just mentioned is constructed to grip the counter blank by engagement with this margin of the counter blank which is uppermost at this time. The holder comprises a plate 191 and two spring grippers which are pivoted on the upper surface of the plate at 192—192. Each of these grippers comprises an arm 193 which is substantially L-shaped, as shown in Fig. 18, and has a counter engaging portion 194 that projects below the lower surface of the plate 191. Secured to the outer side of each arm 193 is a spring 195 shaped similarly to the arm 193 and fastened to the arm by a screw 196. This spring also has an extension 197 similar to the part 194 and normally lying against it, and the rearward ends of these two parts 197 and 194 are provided with oposite bevels so that they form a V-shaped notch between them, as best shown in Fig. 14. The opposite legs of the counter B, Fig. 14, if pushed into these notches would be gripped between the parts 194 and 197. For the purpose of increasing the holding power of each gripper a coiled spring 198, Fig. 17, is arranged to bear against the spring plate 195, the spring 198 being held in position by a screw 200 that is threaded into the arm 193. The two grippers can swing about the pivots 192 toward or from each other, but each gripper normally is held in its outward position by a spring 201 having one end connected to the outer end of the gripper and the other end anchored to a screw 202, threaded in the plate 191. An adjustable stop 203 determines the normal or outward position of each gripper, each stop being secured in its adjusted position by a screw threaded into the plate 191, as clearly shown in Fig. 14. A breast gage 204 is secured to the opposite edges of the plate 191 by screws 205—205, these screws passing through slots which permit the adjustment of the gage toward or from the ends of the grippers. The plate 191 is pivoted at 206 between ears 207—207 that project downwardly from a slide 208. This slide is provided with ways at its opposite edges that embrace the edges of a plate 210 having ears projecting upwardly therefrom, as best shown in Fig. 18, and embracing the lower end of a post or rod 211. A bolt 212 connects the plate 210 and the rod 211 together and permits an angular adjustment of the holder about a horizontal axis transverse to that of the pivots 206. This construction permits the counter holder to slide in a direction endwise of the counter relatively to the plate 210. Normally, however, the holder is held in a predetermined relationship to its supporting parts by a spring 213, connected at one end to the slide 208 and at its opposite end to a part of the plate 210, the movement of the slide produced by this spring, however, being limited by a stop screw 214, Figs. 15 and 18. The post 211 is guided in a bracket 215, see Figs. 1 and 9, which is secured to a slide 216 mounted horizontally in guideways formed in the machine frame, and a rod 217 is pivotally connected to the holder plate 191 and is also connected by a tension spring 218 to a head 220 fixed on the upper end of the post 211. These connections thus tend to swing the counter holder 191 in a clockwise direction about the axis 206, but this movement is limited by a stop screw 221 which is threaded through a part of the slide 208. The holder plate 191 also carries an arm 222, Figs. 16 and 19, having a roll 223 journaled at the upper end thereof and arranged to engage at certain times with the face of a stop or stationary cam formed on the end of an arm 224 that is secured to the bracket 215.

Assuming now that a counter blank has been bent into a U-shape by the bending mechanism and is held by this mechanism in its bent condition, as shown in Figs. 10 and 11, the counter holder is advanced by its operating mechanism into a position between the counter blank and the magazine, the holder moving over the blank. The holder is next lowered until the bottom of the plate 191 is level with the upper edge of the blank, and it is then moved backwardly, thus causing the opposite legs of the counter blank to be forced between the parts 194 and 197 of the grippers. The holder pauses in this position and the plunger 148 then withdraws from between the folders 150—150. As shown at 226 in Fig. 21, the sides of the plunger 148 are grooved or roughened, and during this withdrawal movement these roughened surfaces tend to pull the legs of the counter blank backwardly into the grippers of the holder until this movement is stopped by the ends of the counters striking the breast gage 204. This operation therefore "evens" the counter in the holder and prevents the formation of counters having one leg longer than the other. The counter blank is now operatively positioned in the holder with the holder in the position shown in Figs. 10 and 11. The holder next is moved toward the right, referring to the latter figures, into the position shown in Figs. 12 and 13, thus carrying the counter through the folders 150—150. which tip on their pivots against the tension of the springs 171 to permit the passage of the counter. The counter holder next is moved downwardly to carry the counter blank between the molds. As soon as this holder has been lowered far enough to carry the roll 223 out of contact with the stop 224, the spring 218 operates to tip the holder into the position shown in Fig. 19, and the holder presents the counter blank to the molds while retaining it in this tipped position. The reason for presenting the counter blank in this manner is that the molds tend to tip or pull the breast corners of the counter downwardly, and the holder therefore is tipped enough to compensate for this tendency. Inasmuch as the grippers hold the counter by engagement with the upper margin thereof, the entire body portion of the counter is presented to the grip of the molds.

As the molds grip the counter and move forward into molding relationship, the support 208 for the holder slides on the plate 210, the spring 213 yielding to permit this movement. and thus enables the holder to retain its grip on the counter until the counter has been grasped so firmly by the molds that there is no possibility of its being moved relatively to them. Usually the engagement of the counter with the holder is sufficient to cause the parts to operate as just described, but mechanism is provided for producing this sliding movement of the holder, although the use of this mechanism is optional. This mechanism comprises an arm 228, Figs. 4 and 6, pivoted on a stub shaft 230 and having a laterally projecting arm 231 that extends inwardly far enough to engage a projection 232, Fig. 15, extending from the slide 208. A spring 233, Fig. 4, acts on the arm 228 to hold it normally away from the projection 232. As the male mold 2 moves into molding position, a spring 234, coiled about the forward end of a rod 235 which is secured in the cross head 6, engages a leaf spring 236 screwed to the arm 228 and operates yieldingly to swing the arm on its pivot, this motion being transmitted, as above described, to the counter holder. The range of movement of the arm 228 is limited by nuts threaded on a screw 237, Fig. 6, which extends through an ear carried by the arm 228.

As the side molds move in toward the center mold to grip the counter, the two parallel sides or legs of the counter are moved toward each other, and the movement of the whole of each leg is permitted without disturbing the grip of the holder on the counter by the fact that the grippers are pivoted substantially at the inner ends of the legs of the counters, as clearly shown in Fig. 14.

As soon as the counter is firmly gripped by the molds, the counter holder moves upwardly into its uppermost position, the grippers slipping off the margin of the counter blank at the beginning of this movement. The wiper plate 75 immediately comes forward and crimps the margin of the counter over upon the upper surface of the male mold and irons it down.

The operating mechanism for the counter holder comprises an adjustable link 240, Fig. 1, which connects the slide 216, previously referred to, with the upper end of a lever 241 fulcrumed at 242, the lower end of this lever being connected by a link 243 to one arm of a bell crank lever 244, the opposite arm of which carries a roll running in a path 245 of a cam 246 mounted fast on the shaft 74. The link 243 is adjustably connected with the lever 241, as clearly shown in Figs. 1 and 9, and through this adjustment and that afforded by the link 240, the positions and range of movement of the holder horizontally can be adjusted as desired.

The vertical movements of the counter holder are produced by mechanism comprising a link 248, Fig. 9, which connects the head 220 of the rod 211 with one end of a lever 250 which is fulcrumed at 251 on the upper end of a bracket 252 that is bolted to the slide 216. The opposite arm of the lever 250 carries a roll which runs in a slot or groove 253, Figs. 1 and 9, of a head 254 which is supported on the upper end of a rod 255 partly by a pivot pin 256 and partly by two set screws or bolts 257—257 which bear against opposite sides of a short arm 258 that is secured fast to the rod 255. By turning the screws 257 the vertical position of the holder is adjusted. An adjustable link 260 connects the lower end of the rod 255 with an arm 261 secured fast on a rock shaft 262, Fig. 9, having another arm 263 secured fast thereon and carrying a roll which runs on a cam 264 mounted fast on the shaft 74. This cam produces the downward movements of the counter holder, and the upward movements of said holder are produced by a spring 265 which is connected to the lower end of the link 260. Suitable adjustments are provided in these connections, as will readily be understood.

It sometimes happens that as the counter is presented to the molds it meets some obstruction, as for instance, a counter which has not been ejected. In order to prevent breakage of the parts in case such an accident should occur, a friction or safety mechanism has been included in the connections between the cam 264 and the counter holder. This mechanism may conveniently be located at the connection between the arm 261 and the link 260, and the details of this mechanism are best shown in Fig. 4ª. As there shown the pivot bolt 266, which connects the parts 260 and 261, is encircled by a relatively heavy spring 267, which bears at one end against a nut 268 threaded on the bolt, and at its opposite end against a collar 270 which slides freely on the bolt 266. This collar is provided with V-shaped projections 271 at opposite sides of the bolt which enter correspondingly shaped notches in the link 260. Power is transmitted from the cam operated arm 261 to the link 260 solely through this connection, and if the power required to raise the link 260 is too great, the bevelled projections 271 will slip out of the notches in the link and thus break the normal connection between these parts. The power necessary to effect this disengagement is determined by the adjustment of the spring 267.

The operation of molding the counter blank now having been completed, it is next necessary to remove the molded counter from the male mold on which the counter remains as the molds open. This operation is performed by a doffing mechanism which preferably comprises means for mechanically moving the counter endwise of the center mold far enough to substantially free it from this mold, and additional means which operates to direct a blast of air against the counter so loosened and force it downwardly into a chute which directs it away from the machine. The first of these mechanisms comprises a doffer or small presser foot 273, Figs. 12 and 13, which is adjustably secured on the end of a doffer arm 274, see Figs. 3 and 12. This doffer is brought down on the flange of the counter as the male mold moves backwardly out of molding relationship to the female molds, and it pushes the counter backwardly endwise of the mold far enough to free it from the mold. The mechanism for operating this doffer includes means for raising and lowering the arm 274 and means for swinging this arm. Referring to Figs. 3, 4 and 5 it will be seen that the arm 274 is mounted on the upper end of a vertical shaft 275, the downward movement of which is limited by a collar 276 adapted to rest on the top of a bracket 277. One arm of a bell crank lever 278 acts on the lower end of the rod 275 to lift it, the opposite arm of this lever carrying a roll that runs on a cam 280 fast on the shaft 74.

For producing the swinging movement of the doffer arm, an arm 281 is secured to the rod 275 and is connected by an adjustable link 282 and a swivel joint 283 to the upper end of a bell crank lever 284 fulcrumed at 285 and carrying a roll 286 that runs on the surface of a cam 287 fast on the shaft 74. A strong spring 288 acts on the lever 284 to hold the roll 286 in contact with its cam and hence serves to swing the doffer arm in one direction.

The doffer 273 and the arm 274 would interfere with the changing of the center mold 2, and in order to enable these parts of the doffer mechanism to be moved out of the way, the doffer arm is pivoted at 290, Fig. 5, in a head 291 that is secured to the upper end of the rod 275. This head has a long slot or groove therein to receive the arm, as clearly shown in Figs. 3 and 5. Normally the arm is held in its operative position by a pin 292 that projects through the doffer arm and the part 291. When desired, however, the pin 292 may be removed and the doffer arm may then be swung upwardly about the pivot 290 where it will not interfere with the changing of the center mold or with other repairs, adjustments, or operations performed in the neighborhood of this mold.

Figure 2:
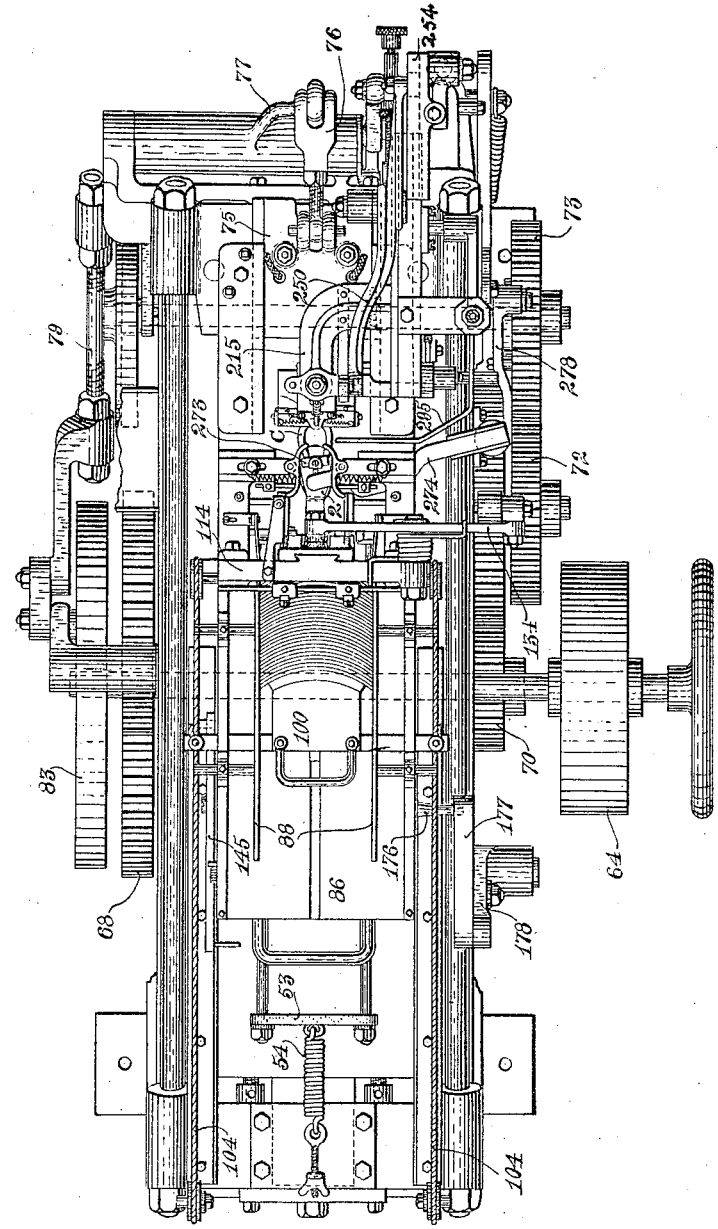
Fig. 2 is a plan view of the machine shown in Fig. 1.

The doffing mechanism just described carries the counter endwise of the center mold into substantially the position shown at C, Fig. 2, and the doffer 273 then rises releasing the counter. In most cases the counter would simply drop off the end of the center mold and fall into an inclined chute or trough 293, Fig. 1, which projects through a hole 294 in the side of the machine frame. Occasionally, however, a counter might fail to drop simply under the influence of gravity, and in order to ensure the removal of the counter from the region of the molds, a blast of air is directed against it immediately after it has been loosened from the male mold, as above described. This blast of air is delivered through a pipe 295, Figs. 2, 4 and 5, which communicates with an air supply pipe 296 leading from any suitable source of compressed air. The flow of air from the pipe 296 to the pipe 295 is controlled by a valve including a valve stem 297, Fig. 5, which rests on one arm of a bell crank lever 298. A spring within the valve normally holds it seated. A rod 299 extends loosely through the other arm of the lever 298 and also projects loosely through a guide 300 secured to the cross head 6. As the cross head moves backwardly to withdraw the male mold from its cooperating molds, the guide 300 strikes a nut 301 adjustably secured on the rod 299 and draws this rod forward, this motion being transmitted through a spring 302 to the lever 298 and serving to lift the valve stem 297 and admit compressed air to the pipe 295. The discharge end of this pipe is so positioned that it directs the air against the loosened counter C, Fig. 2, and shoots it diagonally downward into the discharge trough 293. A receptacle placed under the end of this chute catches the molded counters. The cross head 6 pauses only an instant at the backward limit of its stroke and then moves forward again so that the flow of compressed air is cut off immediately.

The operation of the machine has been described so completely in connection with the description of construction that any further statement as to operation is believed to be unnecessary. It will now be appreciated, however, that the invention provides a very sturdy, substantial and efficient machine for performing automatically the counter molding operation. Furthermore, the parts have been so constructed and arranged, as will readily be appreciated by those skilled in this art, that repairs and adjustments may be made very readily. The fact that the various instrumentalities which act on the counter in carrying it from the magazine to the molds all operate on center lines which lie in the same vertical plane as the center line of the molds, contributes to the compactness of the machine. An especial advantage of this machine from a commercial standpoint is that it will handle clam shell counters. No prior automatic machine, of which I have been able to learn, has successfully handled counters of this character.

While I have herein shown and described the best embodiment of the invention of which I am at present aware, it will be understood that the invention is not limited to embodiment in the form above described, but that various changes in organization and arrangement of the parts may be made without departing from the spirit or scope of the invention. It will also be understood that the invention is not limited to the conjoint use of its several features.

The present application contains certain subject matter disclosed in my prior application Serial No. 315,844, filed August 7, 1919, and the claims on this common subject matter are presented in the present application, the claims in the earlier case being confined to subject matter which cannot be claimed in the present application.

Having thus described my invention, what I desire to claim as new is:

1. In a counter molding machine, the combination with cooperating molds, of means for operating said molds comprising a lever, mechanism operating through said lever to apply the molding pressure to the molds, and additional means operative independently of said mechanism and of its connections with said lever to relatively move the molds into molding relationship prior to the operation of said mechanism.

2. In a counter molding machine, the combination with cooperating molds, of means for operating said molds comprising a lever, mechanism for moving the fulcrum of said lever to relatively move said molds into molding position, and additional mechanism for actuating said lever to apply the molding pressure to the molds.

3. In a counter molding machine, the combination with cooperating molds, of means for operating said molds comprising a lever, mechanism for moving the fulcrum of said lever to relatively move said molds into molding position, and an additional cam operated mechanism for actuating said lever to apply the molding pressure to the molds.

4. In a counter molding machine, the combination with cooperating molds, of means for operating said molds comprising a lever, a cam operated mechanism for moving the fulcrum of said lever to relatively move the molds into molding relationship, and additional mechanism for actuating said lever to apply the molding pressure to the molds.

5. In a counter molding machine, the combination with cooperating molds, of means for operating said molds comprising a lever, a cam, connections between said cam and said lever for actuating the lever to apply molding pressure to the molds, and additional means operative independently of said mechanism and of its connections with said lever to relatively move the molds into molding relationship prior to the operation of said mechanism.

6. In a counter molding machine, the combination with cooperating molds, of means for operating said molds comprising a lever, a cam, connections between said cam and said lever for actuating the lever to apply molding pressure to the molds, a second cam, and connections whereby said second cam is operative independently of said mechanism and of the connections between said mechanism and said lever to relatively move the molds into molding relationship prior to the operation of said mechanism.

7. In a counter molding machine, the combination with cooperating molds, of means for operating said molds comprising a lever, a cam operated toggle mechanism connected with the fulcrum of said lever to relatively move the molds into molding relationship, and additional mechanism for actuating said lever to apply the molding pressure to the molds.

8. In a counter molding machine, the combination with cooperating molds, of means for operating said molds comprising a lever, a cam operated toggle mechanism connected with the fulcrum of said lever to relatively move the molds into molding relationship, and an additional cam operated mechanism for actuating said lever to apply the molding pressure to the molds, said additional mechanism including a spring through which the cam transmits movement to said lever.

9. In a counter molding machine, the combination with a male mold and a pair of female molds cooperating with said male mold, said female molds being hinged for movement relatively to each other into and out of cooperative relationship to the male mold, of mechanism for moving the male mold toward and from the female molds, and connections through which said mechanism acts on the hinge connection between said female molds to force them toward and from each other, said connections including spring means through which the motion is transmitted to the female molds to force them toward each other.

10. In a counter molding machine, the combination with counter shaping molds and operating mechanism therefor, of a counter blank holder comprising two grippers operative to grasp the opposite legs of a counter blank bent into a U-shape and to hold said blank so bent, mechanism for automatically moving said holder from a counter receiving position to a position in which it presents the counter held thereby to said molds, means supporting said grippers for movement toward and from each other about pivots located substantially at the inner ends of said legs of the blank, means for yieldingly holding said grippers apart but permitting them to move toward each other while retaining their grip on the counter as the counter is gripped by the molds, and stops for determining the normal positions of said grippers.

11. In a counter molding machine, the combination with counter shaping molds and operating mechanism therefor, of a holder for a counter blank, and mechanism for automatically moving said holder from a counter receiving position to a position in which it presents the counter held thereby to said molds, said mechanism including a safety device which is adapted to yield to interrupt the normal movement of the holder when an abnormal resistance is offered to the counter blank presenting movement.

12. In a counter molding machine, the combination with male and female molds relatively movable in a substantially horizontal plane into and out of molding relationship, a depending lever fulcrumed near its upper end and connected at the latter end with the male mold, cam operated means connected with the lower end of said lever to apply the molding pressure to the molds, said means including a spring through which the movement of the cam is transmitted to said lever, and cam operated mechanism operative independently of said means and of the connections between said means and said lever to move the male mold into molding relationship to the female molds.

13. In an automatic counter molding machine, the combination of male and female molds, operating mechanism for said molds including means for relatively moving them in a substantially horizontal plane into and out of molding relationship, a magazine positioned above said molds and operative to hold a supply of counter blanks to be molded, instrumentalities for feeding the blanks one at a time out of said magazine, bending each blank so fed into substantially a U-shape and presenting it between said molds, and mechanism for operating said instrumentalities.

14. In an automatic counter molding machine, the combination of cooperating male and female molds, operating mechanism for said molds, a magazine for holding a supply of counter blanks to be molded, instrumentalities for feeding the blanks one at a time out of said magazine, bending each blank so fed into a U-shape and presenting it between said molds, and operating mechanism for said instrumentalities, the center lines of said molds and said blank handling instrumentalities all lying substantially in a common plane.

15. In a counter molding machine, the combination of cooperating male and female molds, operating mechanism for said molds, a magazine for holding a supply of counter blanks to be molded, instrumentalities for feeding the blanks one at a time out of said magazine, bending each blank so fed into a U-shape and presenting it between said molds, and operating mechanism for said instrumentalities, the center lines of said molds, magazine, and said blank handling instrumentalities all lying substantially in a common plane.

16. In a counter molding machine, the combination of cooperating male and female molds, operating mechanism for said molds, a magazine for holding a supply of counter blanks to be molded, instrumentalities for feeding the blanks one at a time out of said magazine, bending each blank so fed into a U-shape and presenting it between said molds, and operating mechanism for said instrumentalities, said blank handling instrumentalities being operative to maintain the center of said blank substantially in the median plane of the molds while it is being transferred to the molds.

17. In an automatic counter molding machine, the combination of male and female molds, operating mechanism for said molds including means for relatively moving them in a substantially horizontal plane into and out of molding relationship, a magazine positioned above said molds and operative to hold a supply of counter blanks to be molded, instrumentalities for feeding the blanks one at a time downwardly out of said magazine, transferring each blank horizontally and bending it into a U-shape during such transferring movement, and then moving the bent blank downwardly to present it between said molds, and operating mechanism for said instrumentalities.

18. An automatic counter molding machine comprising, in combination, counter molding mechanism, mechanism for presenting counter blanks bent into a U-shape to said molding mechanism, the latter mechanism including a movable device for holding a blank in a U-shape and transferring it, bending mechanism operative to bend the blanks substantially into a U-shape for the engagement therewith of said presenting mechanism, and means for delivering blanks one at a time to said bending mechanism.

19. An automatic counter molding machine comprising, in combination, counter molding mechanism, a magazine for holding a supply of clam shell counterblanks, mechanism for feeding said blanks one at a time from said magazine, bending mechanism to which the blanks are delivered by said feeding mechanism arranged to bend the blanks into substantially a U-shape, and means for taking the bent blanks from said bending mechanism and delivering them to the molding mechanism.

20. An automatic counter molding machine comprising, in combination, counter molding mechanism, a magazine for holding a supply of clam shell counter blanks, mechanism for feeding said blanks one at a time from said magazine, bending mechanism to which the blanks are delivered by said feeding mechanism arranged to bend the blanks into substantially a U-shape, and means to which the blanks are delivered by said bending mechanism operative to deliver the bent blanks to the molding mechanism.

21. An automatic counter molding machine comprising, in combination, molding mechanism, a substantially horizontal magazine for counter blanks, mechanism for feeding said blanks one at a time downwardly from said magazine, bending mechanism into which the counter blanks are delivered by said feeding mechanism, and additional mechanism for carrying the bent blanks from said bending mechanism to said molding mechanism.

22. An automatic counter molding machine comprising, in combination, counter molding mechanism, means for feeding counter blanks bent into a U-shape to said mechanism, said means comprising a movable counter blank holder and mechanism operative to bend a counter blank into a U-shape and to deliver said blank to said holder, and means for feeding counter blanks one at a time to said bending mechanism.

23. In an automatic counter molding machine, the combination of a counter molding mechanism, a substantially horizontal magazine for holding a stack of counter blanks, means for feeding said blanks downwardly one at a time out of said magazine, and means including a bending mechanism for delivering the blanks so fed out of the magazine to said molding mechanism, said bending mechanism being operative to bend the blanks into a U-shape to facilitate the positioning of the blanks between the molds of said molding mechanism.

24. In an automatic counter molding machine, the combination of a counter molding mechanism, a substantially horizontal magazine for holding a stack of counter blanks, mechanism for feeding said blanks one at a time downwardly out of said magazine, additional mechanism for delivering the blanks so fed to the molds of the counter molding machine, said additional mechanism including parts normally positioned under said magazine, and supporting means for said magazine enabling it to be moved out of its normal position to permit access to said parts.

25. In an automatic counter molding machine, the combination of counter molding mechanism, a magazine for holding a stack of counter blanks, mechanism for feeding blanks one at a time out of said magazine, means to which the blanks are fed by said feeding mechanism operative to deliver the blanks to said molding mechanism, and stationary means for centering the blanks for the proper operation thereon of said delivering means.

26. In an automatic counter molding machine, the combination of a molding mechanism, a counter blank holder constructed to engage the margin of a counter blank bent into a U-shape and to hold the blank through its engagement with said margin leaving the greater part of the blank projecting free of the holder, mechanism for moving said holder from a counter blank receiving position to a position in which it presents the blank held therein to said molding mechanism, a bending mechanism operative to bend a counter blank into a U-shape preparatory to placing it in said holder, and means for relatively moving the bent counter blank and said holder to enable said holder to operatively engage and hold the margin of the blank.

27. In a machine for operating on counter blanks, the combination of a magazine for holding a stack of said blanks, a stationary abutment at one end of the magazine against which abutment the endmost blank of said stack bears, and means for acting on said blank to move it edgewise in one direction far enough to disengage it from said abutment and then in the opposite direction to carry it past said abutment and out of the magazine.

28. In a machine for operating on counter blanks, the combination of a magazine for holding a stack of said blanks, an abutment at one end of the magazine against which abutment the endmost blank of said stack bears, and a picker mechanism arranged to act on said blank to move it edgewise in one direction far enough to disengage it from said abutment and then in the opposite direction to carry it past said abutment and out of the magazine, said mechanism including pickers to engage the blank.

29. In a machine for operating on counter blanks, the combination of a magazine for holding a stack of said blanks, an abutment at one end of the magazine against which abutment the endmost blank of said stack bears, means for acting on said blank to move it edgewise in one direction far enough to disengage it from said abutment and then in the opposite direction to carry it past said abutment and out of the magazine, and a slotted separator into which the edge of said blank is carried during said first movement, the slot in said separator being only wide enough to admit one blank at a time.

30. In a machine for operating on counter blanks, the combination of a substantially horizontal magazine for holding a stack of said blanks, means for forcing said blanks toward the delivery end of the magazine, means including an abutment at the delivery end of the magazine for limiting said movement of the blanks, pickers movable up and down in a path substantially parallel to the endmost blank in the magazine, and operating mechanism for said pickers including means for jabbing the pickers into the face of the endmost blank and lifting the blank far enough to disengage it from said abutment, and then moving said blank downwardly to carry it past said abutment and out of the magazine.

31. In a machine for operating on counter blanks, the combination of a substantially horizontal magazine for holding a stack of said blanks, means for forcing said blanks toward the delivery end of the magazine, an abutment at the latter end of the magazine to engage the middle portion of the lower edge of the endmost blank in the magazine, two separators located one at each side of the abutment at the delivery end of the magazine and each having a face to bear against the upper part of said endmost blank and having a slot immediately above the upper edge of said blank, said slot being of a width to admit one blank only at a time, pickers movable up and down in front of said endmost blank, and operating mechanism for said pickers including means for jabbing the pickers into the face of the endmost blank to enable the pickers to lift said blank far enough to carry the lower edge of the blank above said abutment and the upper edge of the blank into the slots of said separators, and then to carry said blank downwardly again out of the magazine.

32. In an automatic counter molding machine having counter-shaping molds and means for operating them, a mechanism for bending counter blanks preparatory to positioning them between said molds, said mechanism comprising a plunger, means cooperating with said plunger to hold a counter blank by the central part thereof, devices to engage said blank at opposite sides of said central part, and mechanism for relatively moving said plunger and said devices to bend said blank into substantially a U-shape.

33. In an automatic counter molding machine having counter-shaping molds and means for operating them, a mechanism for bending counter blanks preparatory to positioning them between said molds, said mechanism comprising a plunger, a yielding finger mounted on said plunger and normally positioned in front of the end of the plunger whereby said plunger and finger are operative to hold a counter blank between them, folding devices spaced apart in advance of said plunger to engage the blank near opposite ends thereof, and means for moving said plunger to carry the counter blank held thereby between said devices to bend the blank substantially into a U-shape.

34. In an automatic counter molding machine having counter-shaping molds and means for operating them, a mechanism for bending counter blanks preparatory to positioning them between said molds, said mechanism comprising a plunger, means cooperating with said plunger to hold a counter blank by the central part thereof, two folders spaced apart to engage said blank at opposite sides of said central part, each of said folders being movably mounted, and mechanism for relatively moving said plunger and said devices to bend said blank into substantially a U-shape.

35. In an automatic counter molding machine having counter shaping molds and means for operating them, a mechanism for bending counter blanks preparatory to positioning them between said molds, said mechanism comprising a plunger for engaging the central portion of one face of a counter blank, devices arranged to engage the other face of said blank at opposite sides of the point of engagement therewith of said plunger, and means for relatively moving said plunger and said devices to cause them to bend a counter blank substantially into a U-shape, said plunger comprising two parts relatively adjustable to vary the width of the plunger.

36. In an automatic counter molding machine, the combination with counter shaping molds and operating mechanism therefor, of a substantially horizontal magazine for holding a stack of counter blanks to be molded, mechanism for feeding said blanks downwardly one at a time out of said magazine, means operative to engage the end portions of a blank so fed out of the magazine to center it, relatively reciprocating devices for engaging said blank and bending it substantially into a U-shape, and additional means for delivering the blanks so bent to said molds.

37. In an automatic counter molding machine, the combination with counter shaping molds and operating mechanism therefor, of a magazine for holding a stack of counter blanks to be molded, means for feeding the blanks edgewise out of said magazine one at a time, bending mechanism for operating on each blank so fed and comprising relatively reciprocating devices for bending the blank into substantially a U-shape, and additional mechanism for delivering a blank so bent to the molds.

38. In a counter molding machine, the combination of cooperating counter shaping molds, mechanism for operating said molds, a holder operative to grasp a counter blank bent into a U-shape and to hold said blank by engagement with the margin thereof leaving the greater portion of the blank projecting free from the holder, means for operating said holder to move it from a counter receiving position to a position in which it presents a counter blank held thereby between the molds, and additional means for tipping said holder during its counter presenting movement and for restoring said holder to its normal position again after it has delivered a counter blank held thereby to the molds.

39. In a counter molding machine, the combination with cooperating counter shaping molds and operating mechanism for said molds, of a bending mechanism for bending the counter blank into substantially a U-shape, a holder for receiving a counter blank so bent and holding it in its bent condition while it is delivered to said molds, mechanism for giving said holder its operative movement and means whereby the transfer of said counter blank from said bending mechanism to said holder is effected automatically.

40. In a counter molding machine, the combination with cooperating counter shaping molds and operating mechanism for said molds, of a bending mechanism for bending the counter blank into substantially a U-shape, a holder for receiving a counter blank so bent and holding it in its bent condition while it is delivered to said molds, and means for producing a relative movement of said holder and the counter blank held by the bending mechanism in a direction endwise of the counter to place the counter blank in the grip of said holder.

41. In a counter molding machine, the combination with cooperating counter shaping molds and operating mechanism for said molds, of a bending mechanism for bending the counter blank into substantially a U-shape, a holder for receiving a counter blank so bent and holding it in its bent condition while it is delivered to said molds, means whereby the transfer of said counter blank from said bending mechanism to said holder is effected automatically, and means for effecting an evening of the legs of the counter blank in said holder.

42. In a counter molding machine, the combination of a magazine for holding a supply of counter blanks to be molded, means for feeding the counter blanks out of said magazine one at a time, mechanism for bending the blanks so fed into substantially a U-shape, said bending mechanism comprising a plunger and folders at opposite sides of the plunger, said plunger having rough sides to engage the counter blank, mechanism for delivering the bent counter blanks to the molds of the machine, said delivering mechanism comprising a holder for receiving the blanks while they are held in a bent condition by said bending mechanism, and mechanism for operating said plunger to withdraw it from the bent blank while the blank is in the holder, whereby the roughened sides of the plunger will aid in seating the blank properly in said holder.

43. In a counter molding machine, the combination of a magazine for holding a supply of counter blanks to be molded, means for feeding the counter blanks out of said magazine one at a time, mechanism for bending the blanks so fed into substantially a U-shape, said bending mechanism comprising a plunger and folders at opposite sides of the plunger, mechanism for delivering the bent counter blanks to the molds of the machine, said delivering mechanism comprising a holder for receiving the blanks while they are held in a bent condition by said bending mechanism, and mechanism for operating said holder to cause it to carry each blank forward between said folders and out of the bending mechanism, the folders being yieldingly mounted to permit said movement.

44. In a counter molding machine, the combination of cooperating male and female molds, operating mechanism for moving said molds into and out of molding relationship, and automatic means for removing a counter from said male mold including apparatus for directing a blast of air against the counter.

45. In a counter molding machine, the combination of cooperating male and female molds, operating mechanism for moving said molds into and out of molding relationship, and automatic means acting both mechanically and pneumatically to remove counters from said male mold.

46. In a counter molding machine, the combination of cooperating male and female molds, operating mechanism for moving said molds into and out of molding relationship, automatic means for removing a counter from said male mold including mechanism operative to force each counter longitudinally off the male mold and apparatus for directing a blast of air against the counter so moved to carry it out from between the molds.

47. In a counter molding machine, the combination of cooperating male and female molds arranged horizontally, operating mechanism for moving said molds into and out of molding relationship, automatic means for removing a counter from said male mold including a device arranged to bear on the flange of a counter on said male mold as the male mold moves out of cooperative relationship to the female molds, and thereby to force the counter lengthwise off the male mold, and mechanism for operating said device to move it into and out of cooperative relationship to said male mold.

48. In a counter molding machine, the combination of cooperating male and female molds arranged horizontally, operating mechanism for said molds, and automatic means for removing counters from said male mold comprising means for moving a counter lengthwise of the male mold to loosen it therefrom and apparatus for directing a blast of air against the counter so loosened to blow it downwardly away from the molds.

49. In an automatic counter molding machine having counter shaping molds and means for operating them, a mechanism for bending counter blanks preparatory to positioning them between said molds, said mechanism comprising a part mounted for engagement with the central portion of one face of a counter blank, folders arranged to engage the other face only of said counter blank at opposite sides of the point of engagement therewith of said part, and means for relatively moving said part and said folders to cause the folders to bend a counter blank partly around said part.

50. In an automatic counter molding machine, a mechanism for bending counter blanks preparatory to introduction between the molds of said machine comprising parts to grip the central portion of a counter blank, folders arranged to engage one face only of said counter blank at opposite sides of the point of engagement therewith of said parts, and means for relatively moving said parts and said folders to carry the central portion of said blank past said folders and thereby cause them to bend the counter blank substantially into a U-shape.

51. In a machine for operating on counter blanks, the combination with a horizontal magazine for holding a stack of blanks, an abutment against which the foremost blank in the magazine bears, means for pressing the stack of blanks forward against said abutment, pickers movable up and down in a path substantially parallel to the face of the endmost blank in the magazine, mechanism for reciprocating said pickers in said path, and means actuated by said mechanism for effecting a movement of said pickers into engagement with the foremost blank in the magazine when the pickers are near the upper limits of their movement, and for moving them out of engagement with the blank again when the pickers are near the lower limits of their stroke.

ALBERT E. AYER.